US011522954B2

(12) United States Patent
Li et al.

(10) Patent No.: US 11,522,954 B2
(45) Date of Patent: *Dec. 6, 2022

(54) CROSS DEVICE MESSAGING

(71) Applicant: MICROSOFT TECHNOLOGY LICENSING, LLC, Redmond, WA (US)

(72) Inventors: Gang Li, Bellevue, WA (US); Larry Jin, Bellevue, WA (US); Erin Honeycutt, Redmond, WA (US); Mark Rubinstein, Seattle, WA (US); Jesus Barcons Palau, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,348

(22) Filed: Aug. 5, 2019

(65) Prior Publication Data

US 2019/0364106 A1 Nov. 28, 2019

Related U.S. Application Data

(63) Continuation of application No. 15/011,176, filed on Jan. 29, 2016, now Pat. No. 10,375,163.

(51) Int. Cl.
| | |
|---|---|
| *H04L 67/1095* | (2022.01) |
| *H04L 67/306* | (2022.01) |
| *H04W 4/12* | (2009.01) |
| *H04L 51/043* | (2022.01) |
| *H04L 51/214* | (2022.01) |

(Continued)

(52) U.S. Cl.
CPC ........ *H04L 67/1095* (2013.01); *H04L 51/043* (2013.01); *H04L 51/214* (2022.05); *H04L 67/306* (2013.01); *H04L 67/54* (2022.05); *H04W 4/12* (2013.01); *H04L 51/10* (2013.01); *H04L 51/234* (2022.05)

(58) Field of Classification Search
CPC .... H04L 67/1095; H04L 51/043; H04L 51/14
See application file for complete search history.

(56) References Cited

U.S. PATENT DOCUMENTS

| | | | |
|---|---|---|---|
| 10,375,163 B2 * | 8/2019 | Li | H04W 4/12 |
| 2002/0016818 A1 * | 2/2002 | Kirani | G06F 16/9574 |
| | | | 709/203 |

(Continued)

*Primary Examiner* — Nicholas P Celani
(74) *Attorney, Agent, or Firm* — NovoTechIP International PLLC

(57) ABSTRACT

Systems, methods, and computer-readable media for providing cross device messaging and enhanced synchronization of messages. In some configurations, a distributed service platform may store a user profile. The user profile may include device information (i) indicating active devices associated with the user profile and capabilities of the active devices and (ii) one or more potential relay devices for relaying messages to the active devices. The user profile may be provided to a first device among the active devices referenced in the device information. A signal may be received from the first device that includes a message designating one or more recipient devices from the active devices. One or more relay devices may be selected from the one or more potential relay devices in response to receiving the signal, and the signal may be sent to the one or more relay devices.

19 Claims, 13 Drawing Sheets

(51) Int. Cl.
    *H04L 67/54* (2022.01)
    *H04L 51/10* (2022.01)
    *H04L 51/234* (2022.01)

(56) References Cited

U.S. PATENT DOCUMENTS

| | | | | |
|---|---|---|---|---|
| 2011/0201314 | A1* | 8/2011 | Marsico | H04W 4/18 455/412.1 |
| 2013/0346494 | A1* | 12/2013 | Nakfour | H04L 67/1095 709/204 |
| 2014/0089481 | A1* | 3/2014 | Verrall | H04L 67/2814 709/223 |
| 2014/0289644 | A1* | 9/2014 | Clarke | G06F 3/048 715/752 |
| 2015/0058287 | A1* | 2/2015 | Zhang | H04L 67/1097 707/610 |

* cited by examiner

CROSS DEVICE MESSAGING

CROSS-REFERENCE TO RELATED APPLICATION

This application is a continuation of and claims priority under 35 U.S.C. § 120 to U.S. patent application Ser. No. 15/011,176, filed on Jan. 29, 2016 and entitled "CROSS DEVICE MESSAGING," the entirety of which is incorporated by reference herein in its entirety.

BACKGROUND

Devices, such as smartphones, personal computers, tablets, two-in-one devices, etc. are ubiquitous in society. People use these devices for multiple different functions, such as for communication. Among the methods of communication that is often used is text messaging, e.g., short message service (SMS), multimedia message service (MMS), rich communication service (RCS), via a mobile operator. However, not all devices are configured to send and receive text messages via a mobile operator. While some devices, such as smartphones, may be capable of sending messages, entering a message into the mobile operator compatible device may not be as efficient as entering the message on other non-compatible devices, such as a laptop or a personal computer.

SUMMARY

This disclosure describes systems, methods, and computer-readable media for providing cross-device messaging and enhanced synchronization of messages. In some configurations, a computer system of a distributed service platform may store a user profile. The user profile may include device information (i) indicating active devices associated with the user profile and capabilities of the active devices and (ii) one or more potential relay devices for relaying messages to the active devices. The user profile may be provided to a first device among the active devices referenced in the device information. A signal may be received from the first device that includes a message designating one or more recipient devices from the active devices. The message may include a mobile operator message (e.g., SMS, MMS, RCS, etc.) and/or may include multimedia content. One or more relay devices may be selected from the one or more potential relay devices in response to receiving the signal, and the signal may be sent to the one or more relay devices.

In some configurations, the first device may select the one or more relay devices for relaying the message to the one or more recipient devices, and the first device may provide an indication of the selected one or more relay devices in the message. In some configurations, the computer system may provide the device information to a selected relay device, and the selected relay device may provide to the computing system one or more selected relay devices for relaying the message to the one or more recipient devices. The computing system may cause the message to be sent to one or more third devices by the one or more selected relay devices, and the computing system may receive, from the one or more relay devices, one or more synchronization signals that include a delivered message. The delivered message includes message and metadata associated with a delivery of the message to a respective one of the one or more third devices. The one or more third devices may include (1) one or more relay devices and (2) one or more recipient devices.

In some configurations, the message from the first device may include multimedia content. The computer system may store the multimedia content in a data store and replace the multimedia content in the message with a reference to a network location in the data store at which the multimedia content is stored. The computing device may send the modified message to the one or more selected relay devices instead of the original message that included the multimedia content.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The terms "mobile operator network," "mobile communication network," can be considered synonymous terms with regard to mobile device networks. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
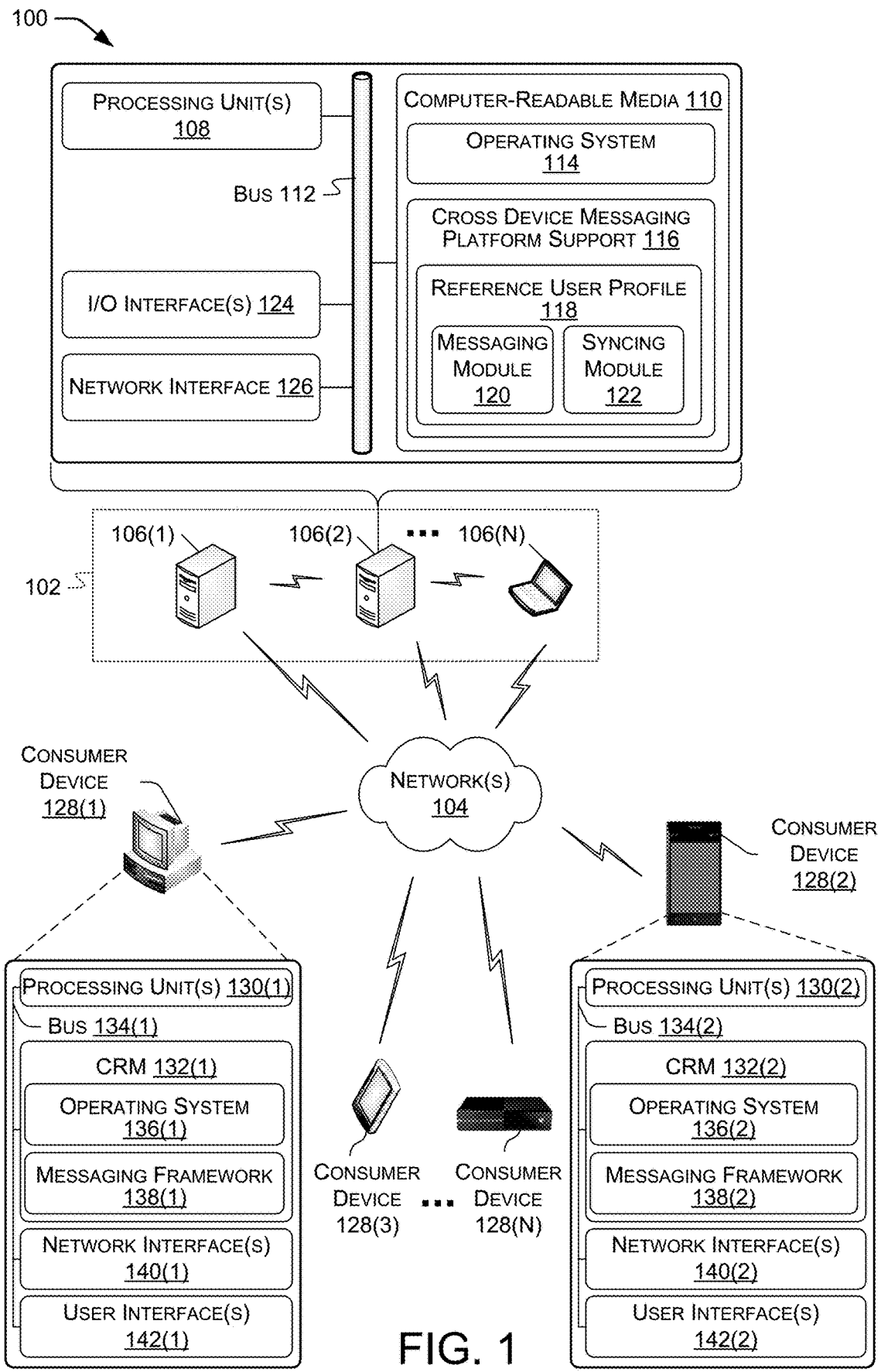
FIG. 1 illustrates an example environment of a cross device messaging system.

The technologies described herein provide techniques and constructs to improve mobile operator messaging capabilities. In some examples, an endpoint computing device can receive an input message (e.g., SMS, MMS, RCS, etc.). The endpoint computing device can send a signal with the message to one or more relay computing devices via a reference user profile on a distributed computing platform (e.g., the Cloud). The relay computing devices may be device including a radio, a subscriber identity module (SIM) card, a reusable identification module (RUIM), and/or other structure by which the relay computing device may transmit messages via a mobile communication network (e.g., global system for mobile communications network (GSM), code division multiple access (CDMA), etc.). Additionally, or alternatively, the relay computing devices can be devices running a particular type of operating system, such as a designated mobile device operating system (e.g., WINDOWS, ANDROID, iOS™, etc.)

In various examples, a relay computing device can receive the signal with the message in a messaging application. The relay computing device can store the message in an outbox of the messaging application. In some examples, the relay computing device can send an acknowledgment signal to the endpoint computing device and/or the reference user profile in the Cloud via a network connection, e.g., Internet, private network, local area network, etc.

In various examples, the relay computing device can send the message to a recipient device via a mobile operator network. In such examples, the relay computing device can store the sent message such as in a database. The sent message can be stored with delivery data, e.g., time of delivery, recipient mobile carrier, etc. In some examples, a first relay computing device can send the message to a second relay computing device for delivery to the recipient device. In such examples, the first relay computing device can send the message to the second relay computing device via the network connection.

The relay computing device can store the message and corresponding delivery data, and send a synchronizing signal (e.g., sync signal) with the delivered message to the reference user profile in the Cloud via a network connection. The reference user profile can store the delivered message in a database, and send the delivered message to the user devices on the user profile, e.g., the endpoint device, and other computing devices. In some examples, the reference user profile can maintain a presence document containing active devices on the user profile. In such examples, the reference user profile can send the delivered message to the devices recognized by the presence document.

Additionally, the reference user profile can send a notification of the delivered message to one or more active devices that are currently in use (e.g., not in a reduced power setting, currently receiving input, etc.). In various examples, the presence document can determine the one or more in-use active devices. The notification can be presented on a display of the one or more in-use active devices. In various examples, the notification can be presented on a user interface of the in-use active device. For example, a desktop computer and a mobile phone can be active devices on a user profile that are currently in-use. The reference user profile can send a notification to a user interface on the desktop computer and/or the mobile phone to indicate that a message was delivered. In some examples, the user profile can include a primary notification device, such as a particular desktop computer, to receive notifications of delivered messages. In such examples, the desktop computer can display the notification and the other active devices on the user profile can merely store the delivered message.

In various examples, the relay computing device can receive updated delivery data from the recipient device, e.g., delivery confirmation, read receipt, etc. In such examples, the relay computing device can store the updated delivery data with the message in the database, and can send a sync signal to the reference user profile corresponding to the message updates. In some examples, the sync signal can include the delivered message, the delivery data and/or the updated delivery data.

Illustrative Environment

The environment described below constitutes but one example and is not intended to limit the claims to any one particular operating environment. Other environments can be used without departing from the spirit and scope of the claimed subject matter.

FIG. 1 shows an example environment 100 in which an improved cross device messaging system can be implemented. In some examples, the various devices and/or components of environment 100 can include a distributed service platform 102 that can facilitate communication between device(s) 106 of the distributed service platform 102 and with external devices via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), hypertext transfer protocol (HTTP), hypertext transfer protocol secure (HTTPS), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, the distributed service platform 102 can include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers or blade servers such as web-servers, map-reduce servers, or other computation engines or network-attached storage units, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102.

In contrast to computer storage media, communication media can embody computer-readable instructions, data structures, program modules, or other data in a modulated data signal, such as a carrier wave, or other transmission mechanism. As defined herein, computer storage media does not include communication media. Executable instructions stored on CRM 110 can include, for example, an operating system 114, a cross device messaging platform support 116 including a reference user profile 118 with a messaging module 120, a syncing module 122, and other modules and programs that are loadable and executable by processing units(s) 108.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 124 to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, and the like). For simplicity, other components are omitted from the illustrated device 106.

Device(s) 106 can also include one or more network interface(s) 126 to enable communications between device 106 and other networked devices involved in cross device messaging, such as consumer device(s) 128 through which a consumer can generate a message (e.g., SMS, MMS, RCS, etc.) for delivery. Such network interface(s) 126 can include one or more network interface controllers (NICs) or other types of transceiver devices to send and receive communications over a network.

Other devices involved in cross device messaging can include consumer devices 128(1)-128(N). Consumer device(s) 128 can belong to a variety of categories or classes of devices such as traditional consumer-type devices, desktop computer-type devices, mobile devices, special purpose-type devices, embedded-type devices, and/or wearable-type devices. Thus, although illustrated in some examples as mobile computing devices, which can have less computing resources than device(s) 106, consumer device(s) 128 can include a diverse variety of device types and are not limited to any particular type of device. Consumer device(s) 128 can include, but are not limited to, server computers or blade servers such as web servers, map/reduce servers, or other computation engines or network-attached storage units, desktop computers (e.g., 128(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices, smartphones (e.g., 128(2)), mobile phones, mobile phone-tablet hybrid devices, or other telecommunication devices, tablet computers (e.g., 128(3)) or tablet hybrid computers, portable or console-based gaming devices (e.g., 128(N)) or other entertainment devices such as network-enabled televisions, set-top boxes, media players, cameras, or personal video recorders (PVRs), automotive computers such as vehicle control systems, or vehicle security systems, or integrated components for inclusion in computing devices, appliances, or other computing devices configured to participate in or carry out cross device messaging as described herein.

Consumer device(s) 128 can represent any type of computing device having one or more processing unit(s) 130 operably connected to computer-readable media (CRM) 132 such as via a bus 134, which in some instances can include one or more of a system bus, a data bus, an address bus, a PCI bus, a Mini-PCI bus, and any variety of local, peripheral, and/or independent buses.

CRM 132, similar to CRM 110, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 or consumer computing device 128.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 132 can include an operating system 136, a messaging framework 138, and other modules, programs, or applications that are loadable and executable by processing units(s) 130. The operating system 136 on device(s) 128 can be any operating system including but not limited to WINDOWS, ANDROID, iOS™, or any other mobile phone operating system capable of managing computer hardware and software resources. In some examples, devices 128(1) and 128(2) can include operating system 136, such as WINDOWS. In various examples, device 128(1) can include operating system 136(1), such as a MICROSOFT WINDOWS, while device 128(2) can include operating system 136(2), such as ANDROID.

Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer device(s) 128 can also include one or more network interfaces 140 to enable communications between consumer device 128(1) and other networked devices such as other consumer device(s) 128(2)-128(N) or devices 106 over network(s) 104. Such network interface(s) 140 can include one or more network interface controllers (NICs) or other types of transceiver devices to send and receive communications over a network. In various examples, the network interface(s) 140 can also include a mobile network interface to enable communication between consumer computing device 128(2) and a recipient device over a mobile communication network connection (e.g., global system for mobile communications network (GSM), code division multiple access (CDMA), etc.). Additionally or alternatively, the network interfaces 140 can include one or more proximity interfaces, which can further include hardware and software to communicate via a proximity network, to further enable communications with other devices involved in cross device messaging, such as consumer device(s) 128(1)-128(N). The proximity network can be peer-to-peer, wireless USB, Bluetooth, IrDA, Z-Wave, body area, or any other wired or wireless path based on the proximity of at least two devices. Proximity can be determined by wired connections and/or proximity sensors. In the proximity network, the device(s) 128 can share data between the device(s), such as, for example, an acknowledgement message between device 128(2) and device 128(2) can be transmitted via a proximity network.

Consumer device(s) 128 can also include user interface(s) 142 to enable the consumer device(s) 128 to receive user input, such as a message, e.g., SMS, MMS, RCS. Additionally or alternatively, the user interface(s) 142 can provide a display of acknowledgment message notifications, new message receipt notifications, delivered message notifications, and/or synchronizing notifications.

Figure 2:
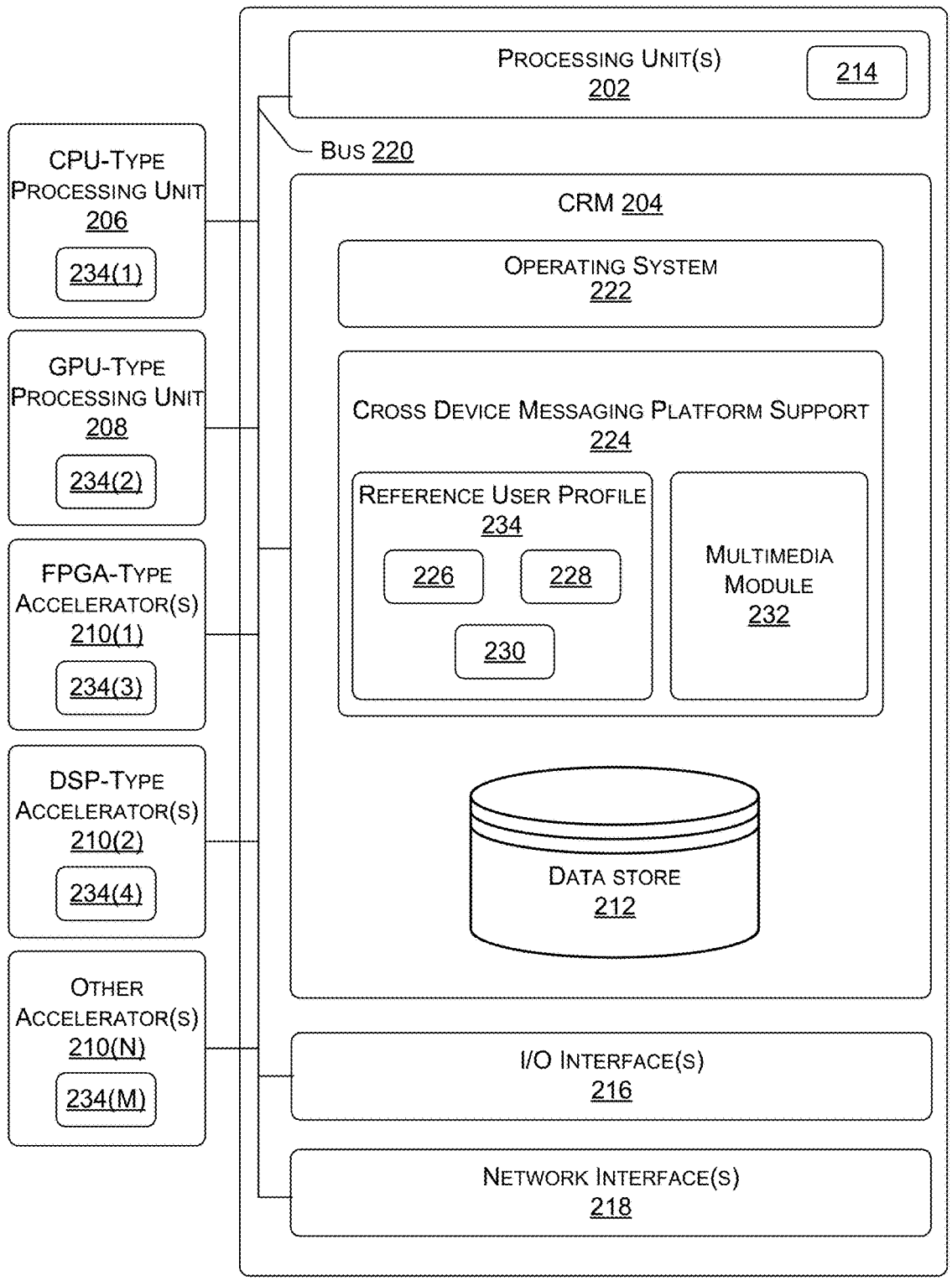
FIG. 2 is a block diagram that illustrates select components of an example device including a cross device messaging platform support consistent with FIG. 1.

FIG. 2 illustrates an example device 200 including a cross device messaging system, such as a device 106 from FIG. 1. In device 200, processing unit(s) 202 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, device 200 can be one of a plurality of devices, such as devices 106(1), 106(2), and 106(N), which are part of a distributed service platform (e.g. the Cloud). In some examples, device 200 can be one of a plurality of devices which are capable of connection via a proximity network. In at least one example, device 200 can be one of a plurality of devices which are both part of a distributed service platform and capable of connection via a proximity network.

In some examples, CRM 204, can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 also includes a data store 212. In some examples, data store 212 includes data storage such as a database, data warehouse, or other type of structured or unstructured data storage. In some examples, data store 212 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 212 can store data for the operations of processes, applications, components, and/or modules stored in CRM 204 and/or executed by processing unit(s) 202. Alternately, some or all of the above-referenced data and/or instructions can be stored on separate memories 214 on board one or more processing unit(s) 202, CPU-type processing unit 206, GPU-type processing unit 208 and/or accelerator(s) 210.

Device 200 can further include one or more input/output (I/O) interfaces 216, which can be I/O interface 124 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device 200, network interface(s) 218, which can be network interface(s) 126, can represent, for example, network interface controllers (NICs) or other types of transceiver devices to send and receive communications over a network.

In the illustrated example, device 200 can operably connect the processing unit(s) 202 to CRM 204, I/O interface(s) 216, and network interface(s) 218 via a bus 220, which corresponds to bus 112. In some examples, bus 220 can include one or more of a system bus, a data bus, an address bus, a PCI bus, a Mini-PCI bus, and any variety of local, peripheral, and/or independent buses.

In the illustrated example, CRM 204 also includes an operating system 222, which can be operating system 114. The operating system 222 can be MICROSOFT WINDOWS, WINDOWS, QNX™, IBM z/OS™ LINUX, ANDROID, iOS™, OS X™, NETBSD™, or any other operating system capable of managing computer hardware and software resources on device 200.

CRM 204 also includes a cross device messaging platform support framework 224, which can be cross device messaging platform support framework 116. Cross device messaging platform support framework 224 can include one or more modules and/or APIs, which are illustrated as blocks 226, 228, 230, and 232, although this is just an example, and the number can vary higher or lower. In some examples, the cross device messaging platform support can include a reference user profile 234. In such examples, one or more modules and/or APIs can be stored in and/or applied to the reference user profile 234. The reference user profile 234 can be a reference account for a user profile, storing user profile data for synchronization of the user profile across multiple devices.

Functionality described associated with blocks 226, 228, 230, and 232, can be combined to be performed by a fewer number of modules and/or APIs, or it can be split and performed by a larger number of modules and/or APIs. For example, block 226 can represent a presence module with logic to program the processing unit 202 to discover active devices on the user profile. In various examples, the presence module can detect when user devices become active on the user profile. For example, the user devices can become active when they are powered on and/or logged into the user profile.

In various examples, the presence module can maintain a presence document (e.g., a list of active devices on the user profile), and can make the presence document available to each of the active devices for discovery. Alternatively, the presence module can push the presence document to the active devices. The presence document can include the active devices and/or capabilities of each device, such as, for example, whether the device can serve as a relay device. For example, the reference user profile 234 can maintain the presence document and can make the presence document available to an endpoint computing device for selection of an active relay computing device through which the endpoint computing device can send an SMS message. In various examples, the presence module can include logic to program the processing unit 202 to push the presence document to the active devices on the user profile. In some examples, the presence module can include logic to process a request from an active device for an updated presence document. In such examples, the presence module can send an updated presence document to the requesting device.

Block 228 can represent a messaging module with logic to program processing unit 202 of device 200 to receive a signal including a message (e.g., SMS, MMS, RCS, etc.). The messaging module can receive a message via one or more network interface(s) 218. In various examples, the messaging module can process the signal comprising the message, and can send it to a relay computing device. The relay computing device can be a particular relay computing device designated by the signal, and/or one or more active relay computing devices on the user profile. In some examples, the messaging module can store the message in a local data store of the reference user profile 234, such as in the messaging module, in the data store 212, and/or on an external data store. In such examples, the message can be saved in a temporary state, such as with no metadata.

In various examples, the messaging module can send the signal including the message to an outbox of the relay computing device, thereby causing the relay computing device to send the message to a designated recipient device, such as a phone. In some examples, the messaging module can cause the relay computing device to send the message via a mobile communication network.

In some examples, the messaging module can further include logic to program the processing unit 202 of device 200 to receive an acknowledgment signal from the relay computing device. The acknowledgment signal can include an indication of receipt of the message. The messaging module can include logic to program the processing unit 202 to send the acknowledgment signal to the endpoint computing device via the network interface(s) 218.

In various examples, the messaging module can determine a failure in the messaging system after a predetermined period of time passes without receipt of the acknowledgment signal. In such examples, the computing system can send a notification to the endpoint device that the relay device was unable to receive the message. In some examples, the notification can include an instruction to check the relay device network connectivity and/or attempt to send the message a second time. In some examples, a second attempt to send the message can overwrite the first message in the local data store of the reference user profile 234.

Block 230 can represent a synchronizing (syncing) module with logic to program processing unit 202 of device 200 to receive syncing signals from active devices on the user profile. In various examples, the syncing module can receive, via the network interface(s) 218, a syncing message from a relay computing device. The syncing signal can include the delivered message (e.g., the message originating at the endpoint computing device and sent to the relay computing device via the messaging module), delivery data related to the delivered message (e.g., time sent, time delivered), and/or updated delivery data (e.g., delivery confirmation, read receipt, etc.).

The syncing module can include logic to program the processing unit 202 of device 200 to store the delivered message and corresponding metadata in the data store 212 and/or an external data store. In various examples, the syncing module can cause the previously saved message corresponding to the delivered message to be deleted from the local data store of the reference user profile 234.

In some examples, the syncing module can push the syncing signal including the delivered message to the active devices on the user profile. In various examples, the syncing module can send the syncing signal to the active devices automatically, upon receipt of the syncing signal from the relay computing device. In some examples, the syncing module can send a syncing signal periodically, such as, for example, at a specified time each hour, day, etc. In such examples, the syncing signal can comprise the messages delivered on the user profile between syncing signals. Additionally or alternatively, the syncing module can send a syncing signal to a device responsive to identifying a logon and/or activation of the device on the user profile. In such examples, the syncing signal can include messages delivered on the user profile since the device was previously logged in and/or activated on the user profile.

Block 232 can include a multimedia module with logic to program the processing unit 202 to store multimedia data corresponding to a message from the endpoint computing device, such as in data store 212 and/or an external data store. The multimedia module can provide a Uniform Resource Locator (URL) or other reference address to a resource storing the multimedia. For example, a message generated at an endpoint computing device can include multimedia. The endpoint computing device can upload the multimedia to the multimedia module. The multimedia module can store the multimedia, and can provide the URL to the endpoint computing device for inclusion in the signal to the relay computing device.

As discussed above, the messaging module can receive the signal including the message, e.g., with the URL corresponding to the multimedia, to an outbox of the relay computing device. In various examples, the relay computing device can download multimedia of a designated size, and send the message including the multimedia via the mobile communication network. The designated size can be determined based on the capabilities of the relay computing device, the recipient computing device, and/or the mobile communication network. In some examples, the relay computing device can send the message including the URL to the recipient computing device. In such examples, the multimedia module can include logic to program the processing unit 202 of device 200 to extract the multimedia content associated with the URL from the data store 212 and/or an external data store, and send the multimedia content to the recipient computing device.

Figure 3:
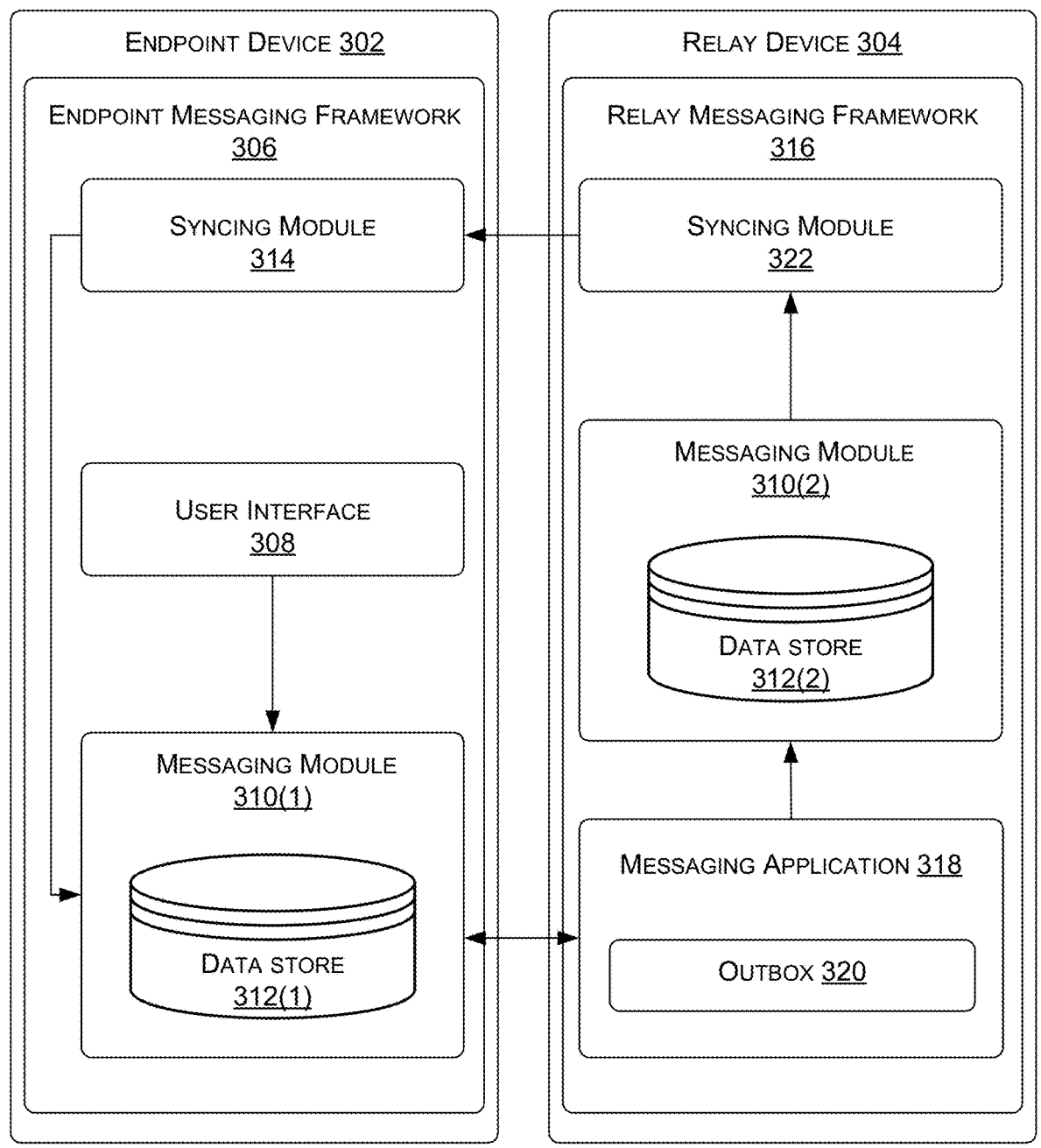
FIG. 3 is a block diagram that illustrates select components of an example endpoint device and an example relay device included in the cross device messaging system consistent with FIG. 1.

FIG. 3 is a block diagram that illustrates select components of an example endpoint device 302 and an example relay device 304 included in the cross device messaging system, such as consumer devices 128(1) and 128(2). In the illustrated example, endpoint device 302 can operate as an endpoint computing device, and relay device 304 can operate as a relay computing device, although this is just an example and each of device 302 and 304 can include both endpoint and relay messaging frameworks. In various examples, the relay device 304 can include a radio, a SIM card, a RUID and/or other method by which the relay device 304 may transmit messages via a mobile communication network. In some examples, the relay computing device 304 can be a device running a mobile device operating system, such as, for example, WINDOWS.

Endpoint device 302 can enable the discovery of the relay device 304, message generation, and message delivery to a recipient device via the relay device 304. Relay device 304 can receive the message from the endpoint device 302, can send the message to the recipient device, and can enable synchronization across devices associated with a user profile. In various examples, the endpoint device 302 can enable the discovery of two or more relay devices 304. In such examples, the two or more relay devices 304 can send the message to one or more recipient devices.

Functionality of the endpoint device 302, described associated with blocks 306, 308, 310(1), and 314, can be combined to be performed by a fewer number of modules and/or APIs, or can be split and performed by a larger number of modules and/or APIs. Similarly, functionality of relay device 304, described associated with blocks 310(2), 316, 318, 320, and 322 can be combined to be performed by a fewer number of modules and/or APIs, or can be split and performed by a larger number of modules and/or APIs.

In the illustrated example, endpoint device 302 can include an endpoint messaging framework 306, corresponding to messaging framework 138(1). In some examples, the endpoint messaging framework 306 can include a user interface 308. The user interface 308 can enable the discovery of active devices on a user profile. In some examples, the user interface 308 can display a presence document provided by the reference user profile. In such examples, the user interface can display a list of active devices, and the capabilities thereof. For example, the user interface 308 can display a list of active relay devices on the user profile, and can enable selection of one or more relay devices, such as relay device 304, to send a generated message to one or more recipient devices.

In various examples, the user interface 308 can enable the input of a message (e.g., SMS, MMS, RCS, etc.) to send to a recipient via the relay device 304. In some examples, the input can include a designation of the relay device 304, a designation of a recipient device, and/or message content.

The user interface 308 can deliver the input to the messaging module 310(1) for processing. In various examples, the messaging module 310(1) can send a signal with the message to the relay device 304 via a reference user profile, such as reference user profile 118 and/or reference user profile 234.

In various examples, the messaging module 310(1) can receive an indication of multimedia content to include with the message. In such examples, the messaging module 310(1) can upload the multimedia content for storage in a multimedia module, such as multimedia module 232. In various examples, the messaging module may receive a URL or other resource identification from the multimedia module, indicating a location of the stored multimedia content. The messaging module 310(1) can embed the URL into the message and send a signal with the message to the relay device 304 via the reference user profile.

In various examples, the messaging module 310(1) can store the message to a data store 312(1). The message can be stored initially as a temporary file. In some examples, the messaging module 310(1) can receive a delivered message from syncing module 314. In such examples, the temporary file can be deleted and/or replaced, and the messaging module 310(1) can store the delivered message in the data store 312(1).

In the illustrated example, relay device 304 can include a relay messaging framework 316, corresponding to messaging framework 138(2).

In various examples, the relay messaging framework 316 can include a messaging application 318. The messaging application 318 can be configured to receive a signal including the message from the endpoint computing device 302. In some examples, the messaging application 318 can receive the signal including the message via the reference user profile on the distributed service platform. In some examples, responsive to receiving the signal including the message, the messaging application 318 can send an acknowledgment signal to the endpoint device 302 via the reference user profile. In some examples, the acknowledgment signal can be provided as a notification via the user interface 308 and/or stored in data store 312(1) corresponding to the message. The acknowledgment signal can provide a means by which the endpoint device 302 can verify a delivery of the message to the relay device 304.

In various examples, the reference user profile and/or the endpoint device 302 can determine a failure in the messaging system when the acknowledgment signal is not received within a predetermined period of time. In some examples, the computing system can send a notification to the endpoint device that the relay device was unable to receive the message. In some examples, the endpoint device 302 can display a notification of message failure via the user interface 308 after the predetermined period of time has passed without receipt of the acknowledgment signal. In some examples, the notification can include instructions to check relay device network connectivity and/or attempt to send the message a second time. In some examples, a second attempt to send the message can overwrite the first message in the data store 312(1).

In various examples, the messaging application 318 can determine that the message includes multimedia content. The determination can be based on a URL associated with the multimedia content being embedded in the message. In various examples, the messaging application 318 can query the recipient device designated in the message to determine a size of the multimedia content to download and deliver to the recipient device. For example, the messaging application 318 may query the recipient device regarding device RCS capability and/or mobile service provider multimedia limitations.

In some examples, the messaging application 318 can access stored data regarding multimedia limitations of the mobile service provider and/or recipient device. For example, the messaging application 318 can access a list of RCS capable devices on a contacts list of the user profile. For another example, the messaging application 318 can access a contacts list comprising capabilities of devices and/or mobile service providers associated with the contacts, such as a maximum message size of a message a device is capable of processing (e.g., 300 KB, 500 KB, 2 MB, 10 MB, 20 MB). The data can be stored in the data store 312(2) on relay device 304, on the reference user profile, and/or on another external data store. In such examples, the messaging application 318 can download an appropriate size of multimedia to deliver to the recipient device.

In various examples, the messaging application 318 can scan the message contents, and determine, based at least in part on the format of the message contents, that the message includes a URL associated with multimedia content. In some examples, the messaging application 318 can include the URL in the delivered message to the recipient device. In such examples, the recipient device can access the URL and can download the multimedia content. In various examples, the recipient device can designate a desired size for the multimedia content upon download.

The messaging application 318 can store the message in an outbox 320 for delivery to the recipient device. The stored message, which originated at the endpoint device 302, can appear to the relay device 304 as a message generated at the relay device 304. Thus, once saved to the outbox, it is transparent to the relay device 304 that the message originated at the endpoint device 302. At least partly in response to the message being stored in the outbox 320, the messaging application 318 can send the message to the designated recipient device. Responsive to delivery confirmation, the messaging application 318 can remove the message from the outbox 320, and can send the delivered message to the messaging module 310(2), for storage in the data store 312(2).

In various examples, the message can include a request for a delivery confirmation, a read receipt, or other information regarding the message delivery. In such examples, the information regarding the message delivery can be received by the messaging application, and sent to the messaging module for storage in the data store 312(2). The information regarding the message delivery can be stored with the delivered message, such as in metadata of the delivered message.

The messaging module 310(2) can send the delivered message to the syncing module 322, for synchronizing the user profile. In various examples, the syncing module 322 can send a syncing signal with the delivered message to syncing module 314 of the endpoint device 302 via the reference user profile. As described above with regard to FIG. 2, the reference user profile can receive the syncing signal with the delivered message from the syncing module 322, and can push the syncing signal to active devices of the user profile, such as to the syncing module 314 of endpoint device 302.

In various examples, the messaging module 310(2) can receive updated information regarding the message delivery. Responsive to receipt of updated information, the messaging module can send syncing signals including the updated information and/or the delivered message to the syncing module 322 via the reference user profile.

The syncing module 314 can receive syncing signals from the syncing module 322 via the reference user profile, and can store the delivered message and/or updated information regarding the delivered message to the data store 312(1). In various examples, messaging module 310(1) can delete the original message saved as a temporary file, and replace it with the delivered message. In some examples, the messaging module 310(1) can automatically delete the temporary file of the original message after a predetermined period of time.

In various examples, endpoint device 302 and/or the relay device 304 can display a notification of the delivered message. The notification can be displayed responsive to receiving the syncing signal. In some examples, the endpoint device 302 can display the notification of the delivered message while the relay device 304 does not display the notification, or vice versa. For example, the endpoint device 302 and/or the relay device 304 can be designated in the user profile as a primary notification device. The designation can be based on a measure of proximity between the endpoint device 302 and the relay device 304, such that when the endpoint device 302 and the relay device 304 are within proximity to one another (e.g., as measured by Wi-Fi sensors, Bluetooth™ sensors, proximity sensors, wired connections, etc.). For another example, the presence document can determine a time in which input via an I/O interface was received on both the endpoint device 302 and the relay device 304. The device with the shortest time from last input can be the device designated to display the notification. For yet another example, responsive to receipt of the message at the endpoint device 302, the endpoint device 302 can verify that the reference user profile recognizes the endpoint device 302 as an in-use active device. Responsive to a determination that the reference user profile recognizes the endpoint device 302 as an in-use active device, the endpoint device 302 can display the notification.

Figure 4:
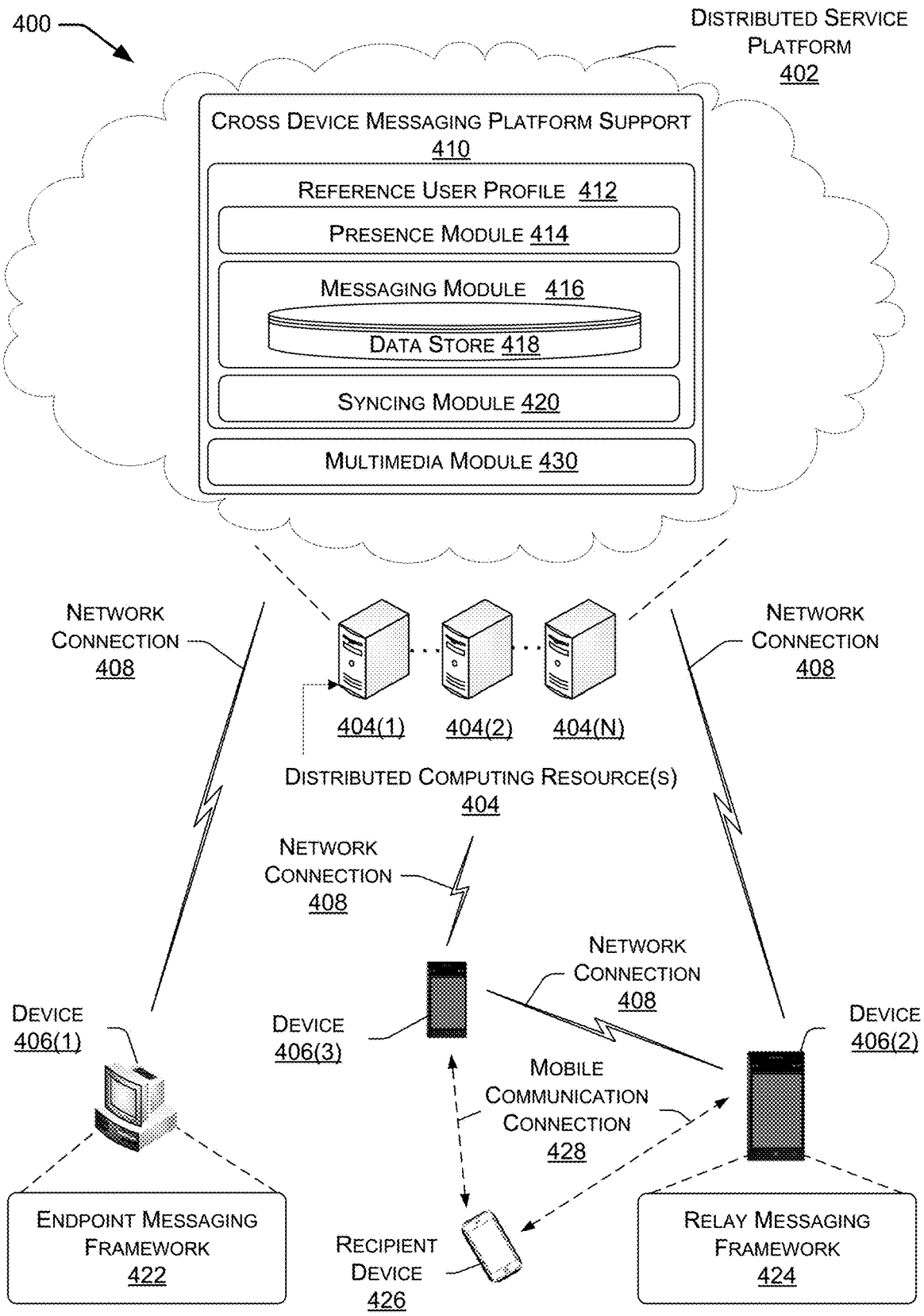
FIG. 4 illustrates an example network environment of the cross device messaging system consistent with the preceding figures.

FIG. 4 illustrates an example network environment 400 of the cross device messaging system consistent with the preceding figures. Network environment 400 can include a distributed service platform 402, such as distributed service platform 102.

A distributed service platform 402 can include one or more distributed computing resource(s) 404, such as distributed computing resources 404(1)-404(N). Distributed computing resources 404(1)-404(N) can correspond to distributed computing resources 106(1)-106(N). As described above with regard to FIG. 1, distributed computing resource(s) 404 can include any type of computing device capable of connecting to other device(s) 406, such as consumer device(s) 128, via a network connection 408.

In some examples, the network connection 408 can be wired or wireless and, in response to device(s) 406 being discoverable via network connection 408, can be capable of data transmission from device(s) 406 to distributed service platform 402, and from distributed service platform 402 to device(s) 406.

In the illustrated example, distributed service platform 402 can include a cross device messaging platform support 410, such as cross device messaging platform support 116 and 224, to enable the cross device messaging system. The cross device messaging platform support 410 can include at least one reference user profile 412. In some examples, the reference user profile 412 can store user profile data including, but not limited to delivered messages and corresponding metadata, recipient device information for user contacts, device capability for device(s) 406, user preferences, and/or any other data associated with the profile of a user. The reference user profile 412 can store user profile data from at least one of a plurality of devices 406 configured to a user profile. In some examples, the reference user profile 412 can serve as a central reference point of user profile data for the at least one of a plurality of devices 406 in the cross messaging system.

As illustrated in FIG. 4, the reference user profile 410 can include a presence module 414, a messaging module 416, a data store 418, and a syncing module 420.

In various examples, the presence module 414 can detect when device(s) 406 become active on the user profile. The device(s) 406 become active when they are powered on and/or logged onto the user profile. The presence module 414 can maintain a presence document (e.g., a list of active devices on the user profile), and can update the presence document responsive to new device(s) 406 logging onto the user profile. A device 406 can be logged onto the user profile responsive to entering a user defined password, powering on and/or awakening a registered device, and/or other authorized action on a registered device. The presence document can include the active devices and capabilities of each device, such as, for example, whether the device can be a relay device (e.g., whether the device includes a radio, SIM card, RUID card, running a mobile device operating system, etc.), a number associated with SIM cards and/or RUID cards of the device, and/or a country associated with SIM cards and/or RUID cards of the device.

In various examples, the presence module 414 can make the presence document available to each of the active device(s) 406 for discovery. For example, the presence module 414 can send the presence document to an endpoint messaging framework 424 on device 406(1) for selection of an active relay device, e.g., device 406(2), through which the endpoint device 406(1) can send a message. For another example, the presence module 414 can send the presence document to the endpoint messaging framework 424 on device 406(1) for selection of a number associated with a SIM card located in active relay device, e.g., device 406(2), through which the endpoint device 406(1) can send a message.

In some examples, the reference user profile 410 can include the messaging module 416. The messaging module 416 can be configured to receive a signal including a message (e.g., SMS, MMS, RCS, etc.) from device 406(1) via the network connection 408, and send the signal with the message to device 406(2) via the network connection 408. In some examples, the messaging module 416 can store the message in a local data store of the reference user profile 410, such as in the data store 418, and/or on an external data store. In such examples, the message can be saved to the reference user profile 410 in a temporary state, such as with no metadata.

In various examples, the messaging module 416 can send the signal including the message to an outbox of the relay messaging framework 424 of the device 406(2), thereby causing the device 406(2) to send the message to a recipient phone 426 via a mobile communication connection 428 (e.g., global system for mobile communications network (GSM) connection, code division multiple access (CDMA) connection, etc.). In such examples, the recipient phone 426 and/or a SIM card, RUIM card, and/or phone number associated therewith can be designated in the message generated in the endpoint messaging framework 422.

In some examples, the messaging module 416 can send the signal including the message to device 406(2), for delivery to device 406(3). In such examples, device 406(2) can act as a switchboard to enable the message to be sent from a third user device, device 406(3), to recipient device 426 via the mobile communication connection 428. In various examples, the relay messaging framework 424 can recognize that a number (e.g., SIM card number, RUID card number) corresponding to a recipient device is associated with a country other than the device 406(2). The relay messaging framework 424 can determine, via the reference user profile 412 that a third user device, device 406(3), is active on the user profile, and includes a number associated with the same country as the recipient device. The relay messaging framework 424 can then send the signal including the message to device 406(3) via network connection 408 for delivery to recipient device 426. In some examples, the endpoint messaging framework 422 can enable the selection of an active relay device, such as device 406(3) in the country associated with the recipient device 426. Additionally or alternatively, the endpoint messaging framework 422 can enable the selection of an intermediate relay device, such as device 406(2) and a delivery relay device, such as device 406(3).

For example, a first user device, such as device 406(1), can be located in one country, e.g., France, and a second user device, such as device 406(2), can include a SIM card associated with that country. The first user device can designate a third user device, such as device 406(3), including a SIM card associated with a second country, e.g., the United States as the desired device to send the message to a recipient device, such as recipient device 426, located in the second country. The first user device can send the signal including the message via the cross device messaging platform support 410 and the network connection 408 to the second user device located in the first country, e.g., France. The second user device can then send the message via the network connection 408 to the third user device in second country, e.g., the United States. Responsive to receipt of the signal, the third user device can store the message in an outbox, and send the message to the recipient device 426 via mobile communication connection 428. Alternately, the first user device can send the message to the third user device located in the second country, e.g., the United States via the network connection 408 and the cross device messaging platform support 410. The third user device can consequently send the message to the recipient device 426 via the mobile communication connection 428.

In various examples, messaging module 416 can be configured to receive an acknowledgment signal from the relay messaging framework 424 via the network connection 408. The acknowledgment signal can include acknowledgment of receipt of the message to deliver. The messaging module 416 can be further configured to send the acknowledgment signal to the endpoint messaging framework 422 via the network connection 408.

In the illustrated example, the reference user profile 412 includes a syncing module 420, such as syncing module 122. The syncing module 420 can be configured to receive syncing signals including delivered messages from the relay messaging framework 424 of device 406(2) via the network connection 408. In various examples, the relay messaging framework 424 can send the syncing signal to the syncing module 420 responsive to confirmation by device 406(2) that the message was sent to recipient device 426. In such examples, the reference user profile 412 synchronizes messages with sent messages, thereby ensuring that unsent messages are not stored to the reference user profile 412 and/or other device(s) 406.

In various examples, the syncing signals received by the syncing module 420 can include delivery data related to the delivered message (e.g., time sent, etc.), and/or updated delivery data related to the delivered message (e.g., delivery confirmation, read receipt, etc.). The syncing module 420 can store the message, delivery data and/or updated delivery data to the data store 418. In some examples, the message, delivery data and/or updated delivery data can replace the temporary file of the original message sent from the device 408(1) to the device 408(2) via the messaging module 416.

In some examples, the syncing module 420 can push the syncing signal including the delivered message, the delivery data and/or the updated delivery data to the active device(s) 406 on the user profile, such as device 406(1) and 406(3). In various examples, the syncing module 420 can send the syncing signal to the active device(s) 406 automatically, upon receipt of the syncing signal from the device 406(2). In some examples, the syncing module 420 can send the syncing signal periodically, such as, for example, at a specified time each hour or day. In such examples, the syncing signal can comprise the messages delivered on the user profile between syncing signals. Additionally or alternatively, the syncing module 420 can send a syncing signal to a device 406 upon logon and/or activation of the device on the user profile. In such examples, the syncing signal can include messages delivered on the user profile since the device was previously logged in and/or activated on the user profile.

In the illustrated example, the cross device messaging platform support 410 can also include a multimedia module 430. The multimedia module 430 can be configured to receive multimedia content corresponding to a message from the endpoint messaging framework 422 of device 406(1). The endpoint messaging framework 422 can upload the multimedia content to the multimedia module 430, and the multimedia module 430 can store the multimedia content to a data store, such as data store 418 and/or an external data store. The multimedia module 430 can provide a Uniform Resource Locator (URL) or other reference address in which the multimedia content is stored. For example, a message generated at device 406(1) can include multimedia. The device 406(1) can upload the multimedia to the multimedia module 420. The multimedia module 420 can store the multimedia content, and can provide the URL to the endpoint messaging framework 422 for inclusion in the signal to the relay messaging framework 424 of device 406(2).

As discussed above, the messaging module 416 can receive the signal including the message, e.g., with the URL corresponding to the multimedia, and send it to an outbox of the relay messaging framework 424. In various examples, the relay messaging framework 424 can download multimedia content of a designated size, and send the message including the multimedia content to the recipient device 426 via the mobile communication connection 428. The designated size can be determined based on the capabilities of the device 406(2), the recipient device 426, and/or the mobile communication connection 428.

In various examples, the capabilities of the device 406(2), the recipient device 426, and/or the mobile communication network 428 can be stored in the reference user profile 412, such as in data store 418 and/or an external data store. For example, the reference user profile 412 can store a contacts list with multimedia limitations and/or capabilities, such as RCS capability, of each contact and device associated therewith on the contact list. In some examples, the reference user profile 412 can push capability data to the relay messaging framework 424, for storage therein.

In various examples, the relay messaging framework 424 can query the recipient device 426 for multimedia limitations with regard to the recipient device 426 and the mobile communication connection 428 associated therewith. For example, the relay messaging framework 424 may query the recipient device 426 regarding device RCS capability and/or mobile service provider multimedia limitations.

In various examples, responsive to determining the multimedia capabilities of the recipient device 426 and/or the mobile communication connection 428, the relay messaging framework 424 can download multimedia content of an appropriate size and deliver the multimedia content in the message to the recipient device 426.

In some examples, the device 406(2) can send the message including the URL to the recipient computing device 426. In such examples, the recipient computing device 426 can download the multimedia content from the designated URL as desired. In various examples, the recipient device 426 can designate a desired size for the multimedia content upon download.

Illustrative Processes

FIGS. 5-12 are flow diagrams depicting example processes for cross device messaging. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

Figure 5:
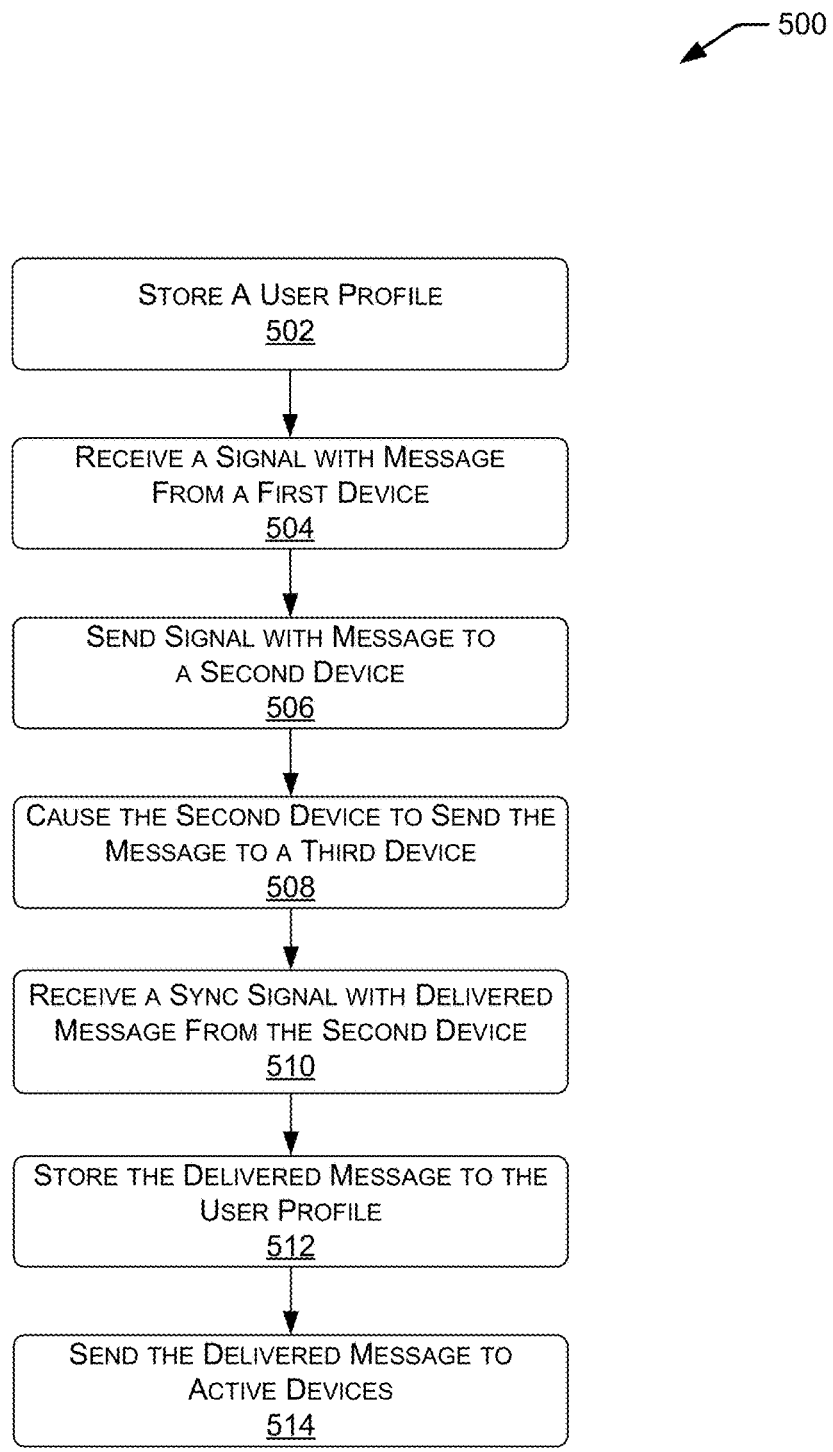
FIG. 5 is a flow diagram that illustrates a process flow of cross device messaging.

FIG. 5 is a flow diagram that illustrates a process flow 500 of cross device messaging.

At block 502, a computing system associated with a distributed service platform can store a user profile on a database. The user profile can include a reference account for the user profile, storing user profile data for synchronization of the user profile across multiple devices. In various examples, the user profile can include, but is not limited to device capabilities for user devices, user preferences, delivered messages and corresponding metadata, recipient device information for user contacts, and/or any other data associated with the profile of a user.

In various examples, the user profile can include a presence document including a list of active devices (e.g., powered on and/or logged on devices) on the user profile. The presence document can include the active devices and capabilities of each device, such as, for example, whether the device can be a relay device, a number associated with one or more SIM cards and/or RUID cards of the relay device, and/or a country associated with the SIM cards and/or RUID cards of the device. For example, the reference user profile can maintain the presence document and can make the presence document available to an endpoint computing device for selection of an active relay computing device through which the endpoint computing device can send a message.

At block 504, the computing system can receive a signal with a message from a first device. The first device can be an endpoint device associated with the user profile. The message can include a text, a URL of multimedia content, instructions for delivery confirmation (e.g., a request for delivery confirmation, a request for a read receipt, etc.). In various examples, the computing system can receive the signal with the message via a network connection, such as a WiFi or other Internet connection. In some examples, the computing system can store the message in a local data store.

At block 506, the computing system can send the signal with the message to a second device. The second device can include a relay device associated with the user profile. In various examples, the computing system can send the message to an outbox in the relay device.

At block 508, the computing system can cause the second device to send the message to a third device. The third device can be a device associated with the user profile and/or a device associated with another user profile. In various examples, the computing system can cause the second device to send the message by causing the message to be saved in an outbox of the second device. In such examples, the second device can treat the message as an organically generated message (e.g., a message generated on the relay device itself).

At block 510, the computing system can receive a synchronizing (e.g., syncing) signal with a delivered message from the second device. The delivered message can include metadata with regard to the message delivery (e.g., a time sent from relay device, etc.).

In various examples, the computing system can receive more than one synchronizing signal for a particular delivered message. In such examples, the computing system may receive syncing signals with updated delivery data, such as, for example, delivery confirmation, read receipt, etc. In some example, the delivery data may be based, at least in part, on instructions included in the message generated at the endpoint device to request delivery confirmation from the recipient device. In other examples, the requested delivery confirmation can be a setting saved in the user profile.

In various examples, the computing system can determine a failure in the messaging system responsive to not receiving the syncing signal within a predetermined period of time after block 508. In such examples, the computing system can send a notification to the first device to indicate the failure.

At block 512, the computing system can store the delivered message in a data store of the user profile. In various examples, the original message can be deleted based in part on the receipt and storage of the corresponding delivered message. In some examples, the delivered message can replace the original message. In various examples, the computing system can save updated delivery data to the stored delivered message based in part on receiving additional syncing signals with updated delivery data.

At block 514, the computing system can send the delivered message to the active devices on the user profile. The computing system can determine the active devices based at least in part on the devices logged on to the user profile. In various examples, the computing system can recognize newly logged on devices, and can send a syncing signal to the newly logged on devices including the messages and corresponding metadata delivered since the last time device was logged on to the user profile.

Figure 6:
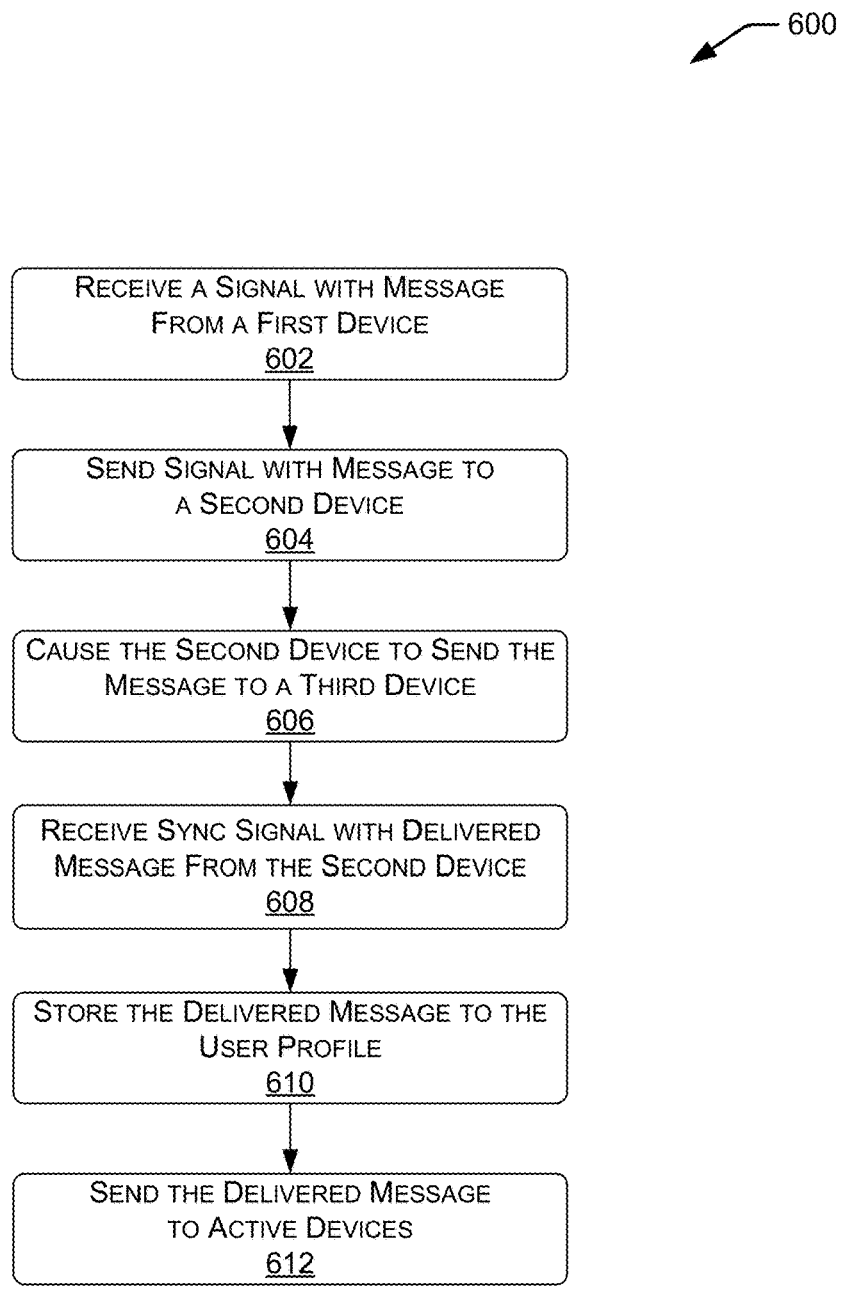
FIG. 6 is a flow diagram that illustrates a process flow of cross device messaging.

FIG. 6 is a flow diagram that illustrates a process flow 600 of cross device messaging.

At block 602, a computing system can receive a signal with a message from a first device. In various examples, the computing system can be associated with a distributed service platform. The first device can be an endpoint device associated with the user profile. The message can include a text, a URL of multimedia content, instructions for delivery confirmation (e.g., a request for delivery confirmation, a request for a read receipt, etc.). In various examples, the computing system can receive the signal with the message via a network connection, such as a WiFi or other Internet connection. In some examples, the computing system can store the message in a local data store.

At block 604, the computing system can send the signal with the message to a second device. The second device can include a relay device associated with the user profile. In various examples, the computing system can send the message to an outbox in the relay device. In some examples, the computing system can send the signal with the message to two or more relay devices.

At block 606, the computing system can cause the second device to send the message to a third device. The third device can be a device associated with the user profile and/or a device associated with another user profile. In various examples, the computing system can cause the second device to send the message by causing the message to be saved in an outbox of the second device. In such examples, the second device can treat the message as an organically generated message (e.g., a message generated on the relay device itself). In examples in which the computing system sends the signal with the message to two or more devices, the computing system can cause the two or more devices to send the message to two or more recipient devices.

At block 608, the computing system can receive a synchronizing (e.g., syncing) signal with a delivered message from the second device. The delivered message can include metadata with regard to the message delivery (e.g., a time sent from relay device, etc.).

In various examples, the computing system can determine a failure in the messaging system responsive to not receiving the syncing signal within a predetermined period of time after block 606. In such examples, the computing system can send a notification to the first device to indicate the failure.

In various examples, the computing system can receive more than one synchronizing signal for a particular delivered message. In such examples, the computing system may receive syncing signals with updated delivery data, such as, for example, delivery confirmation, read receipt, etc. In some example, the delivery data may be based, at least in part, on instructions included in the message generated at the endpoint device to request delivery confirmation from the recipient device. In other examples, the requested delivery confirmation can be a setting saved in the user profile.

At block 610, the computing system can store the delivered message. In various examples, the computing system can store the delivered message in a data store of a user profile. In various examples, the original message can be deleted based in part on the receipt and storage of the corresponding delivered message. In some examples, the delivered message can replace the original message. In various examples, the computing system can save updated delivery data to the stored delivered message based in part on receiving additional syncing signals with updated delivery data.

At block 612, the computing system can send the delivered message to the active devices. The active devices can be devices associated with the user profile. The computing system can determine the active devices based at least in part on the devices logged on to the user profile. In various examples, the computing system can recognize newly logged on devices, and can send a syncing signal to the newly logged on devices including the messages and corresponding metadata delivered since the last time device was logged on to the user profile.

Figure 7:
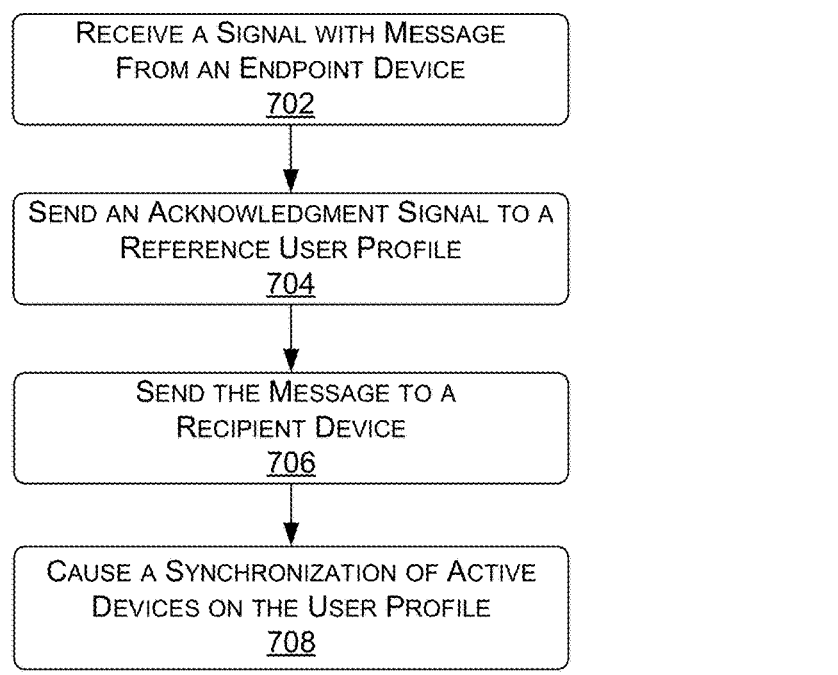
FIG. 7 is a flow diagram that illustrates a process flow of cross device messaging.

FIG. 7 is a flow diagram that illustrates a process flow 700 of cross device messaging.

At block 702, a device can receive a signal with a message from an endpoint device. The endpoint device can be a device associated with a user profile. The message can include a text, a URL of multimedia content, instructions for delivery confirmation (e.g., a request for delivery confirmation, a request for a read receipt, etc.). In various examples, the computing system can receive the signal with the message via a network connection, such as a WiFi or other Internet connection. In some examples, the device can receive the signal from the endpoint device via a reference user profile stored in a distributed service platform.

At block 704, the device can send an acknowledgment signal to a reference user profile. The reference user profile can include a reference account for a user profile, storing user profile data for synchronization of the user profile across multiple devices. In various examples, the user profile can include, but is not limited to device capabilities for user devices, user preferences, delivered messages and corresponding metadata, recipient device information for user contacts, and/or any other data associated with the profile of a user.

In some examples, the device can send the acknowledgment signal to the endpoint device via the reference user profile. The acknowledgment signal can be an indication of receipt of the message at the device and/or an acknowledgment by the device of the task to send the message via a mobile communication connection.

In various examples, the endpoint device and/or the reference user profile can determine a failure in the messaging system when the acknowledgment signal is not received within a predetermined period of time. In such examples, the endpoint device can display a notification on a user interface indicating that the device was unable to receive the message. In some examples, the notification can be sent to the endpoint device from the reference user profile.

At block 706, the device can send the message to a recipient device. In various examples, the recipient device can be designated by the message. In some examples, the device can send the message to more than one recipient device. The recipient device(s) can be devices associated with the user profile and/or devices associated with another user profile.

At block 708, the device can cause a synchronization of active devices on the user profile. In various examples, the device can cause the synchronization by sending a syncing signal with the delivered message to the reference user profile. In such examples, the reference user profile can process the syncing signal, save the delivered message to a data store of the reference user profile, and send the delivered message to the active devices associated with the user profile. The active devices can be the devices logged on to the user profile.

In various examples, the reference user profile and/or the endpoint device can determine a failure in the messaging system responsive to not receiving the delivered message within a predetermined period of time. In such examples, the endpoint device can display a notification on a user interface indicating that the device was unable to send the message. In some examples, the notification can be sent to the endpoint device from the reference user profile.

Figure 8:
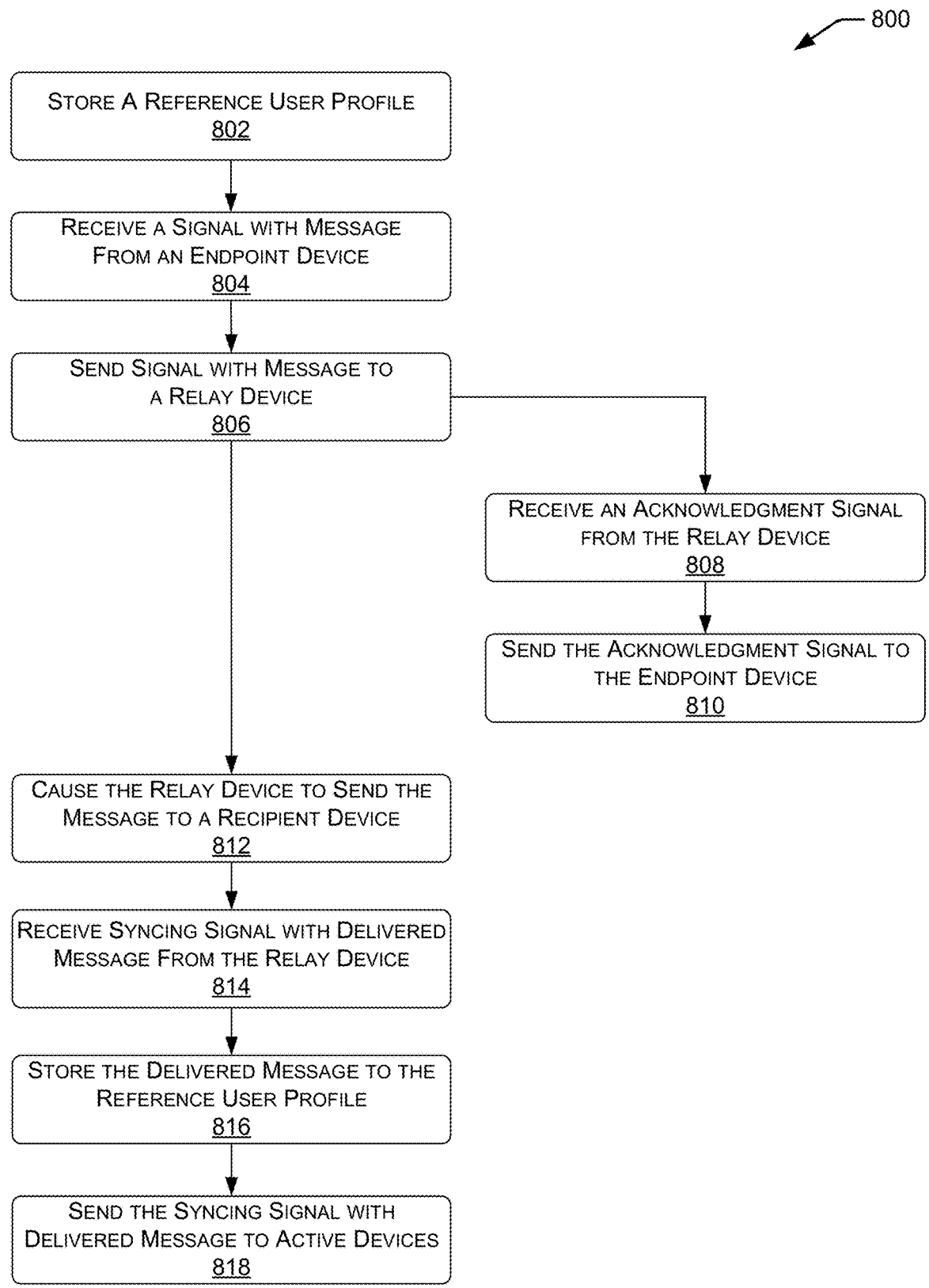
FIG. 8 is a flow diagram that illustrates a process flow of cross device messaging.

FIG. 8 is a flow diagram that illustrates a process flow 800 of cross device messaging.

At block 802, a computing system associated with a distributed service platform can store a reference user profile on a database. The reference user profile can include a reference account for a user profile, storing user profile data for synchronization of the user profile across multiple devices. In various examples, the reference user profile can include user profile data including, but not limited to device capability for user device, user preferences, delivered messages and corresponding metadata, recipient device information for user contacts, and/or any other data associated with the profile of a user.

In various examples, the reference user profile can include a presence document including a list of active devices (e.g., powered on and/or logged on devices) on the user profile. The presence document can include the active devices and capabilities of each device, such as, for example, whether the device can be a relay device, a number associated with one or more SIM cards and/or RUID cards of the relay device, and/or a country associated with the SIM cards and/or RUID cards of the device. For example, the reference user profile can maintain the presence document and can make the presence document available to an endpoint computing device for selection of an active relay computing device through which the endpoint computing device can send a message.

At block 804, the computing system can receive a signal with a message from an endpoint device. The message can include a text, a URL of multimedia content, instructions for delivery confirmation (e.g., a request for delivery confirmation, a request for a read receipt, etc.). In various examples, the computing system can receive the signal with the message via a network connection, such as a WiFi or other Internet connection. In some examples, the computing system can store the message in a local data store.

At block 806, the computing system can send the signal with the message to a relay device. In various examples, the computing system can send the message to an outbox in the relay device.

At block 808, the computing system can receive an acknowledgement signal from the relay device. The acknowledgment signal can be an indication of receipt of the message at the relay device and/or an acknowledgment by the relay device of the task of sending the message via the mobile communication connection.

In various examples, the computing system can determine a failure in the messaging system when the acknowledgment signal is not received within a predetermined period of time. In such examples, the computing system can send a notification to the endpoint device that the relay device was unable to receive the message.

At block 810, the computing system can send the acknowledgment signal to the endpoint device. In various examples, the endpoint device can display a notification of receipt of the message at the endpoint device. In such examples, the notification can be an indication of successful transmission of the message to the relay device.

In various examples, the endpoint device can determine a failure in the messaging system after a predetermined period of not receiving the acknowledgment signal. In such examples, the endpoint device can display a notification of message failure. In some examples, the notification can include an instruction to check relay device network connectivity, and attempt to send the message a second time. In some examples, a second attempt to send the message can overwrite the first message in the local data store.

At block 812, the computing system can cause the relay device to send the message to a recipient device. In various examples, the computing system can cause the relay device to send the message by causing the message to be saved in an outbox of the relay device. In such examples, the relay device can treat the message as an organically generated message (e.g., a message generated on the relay device itself).

At block 814, the computing system can receive a synchronizing (e.g., syncing) signal with a delivered message from the relay device. The delivered message can include metadata with regard to the message delivery (e.g., a time sent from relay device, etc.).

In various examples, the computing system can receive more than one synchronizing signal for a particular delivered message. In such examples, the computing system may receive syncing signals with updated delivery data, such as, for example, delivery confirmation, read receipt, etc. In some example, the delivery data may be based, at least in part, on instructions included in the message generated at the endpoint device to request delivery confirmation from the recipient device. In other examples, the requested delivery confirmation can be a setting saved in the reference user profile.

In various examples, the computing system can determine a failure in the messaging system responsive to not receiving the syncing signal within a predetermined period of time after block 812. In such examples, the computing system can send a notification to the first device to indicate the failure.

At block 816, the computing system can store the delivered message in a data store of the reference user profile. In various examples, the original message can be deleted based in part on the receipt and storage of the corresponding delivered message. In some examples, the delivered message can replace the original message. In various examples, the computing system can save updated delivery data to the stored delivered message based in part on receiving additional syncing signals with updated delivery data.

At block 818, the computing system can send the syncing signal with the delivered message to the active devices on the user profile. The computing system can determine the active devices based at least in part on the devices logged on to the user profile. In various examples, the computing system can recognize newly logged on devices, and can send a syncing signal to the newly logged on devices including the messages and corresponding metadata delivered since the last time device was logged on to the user profile.

Figure 9:
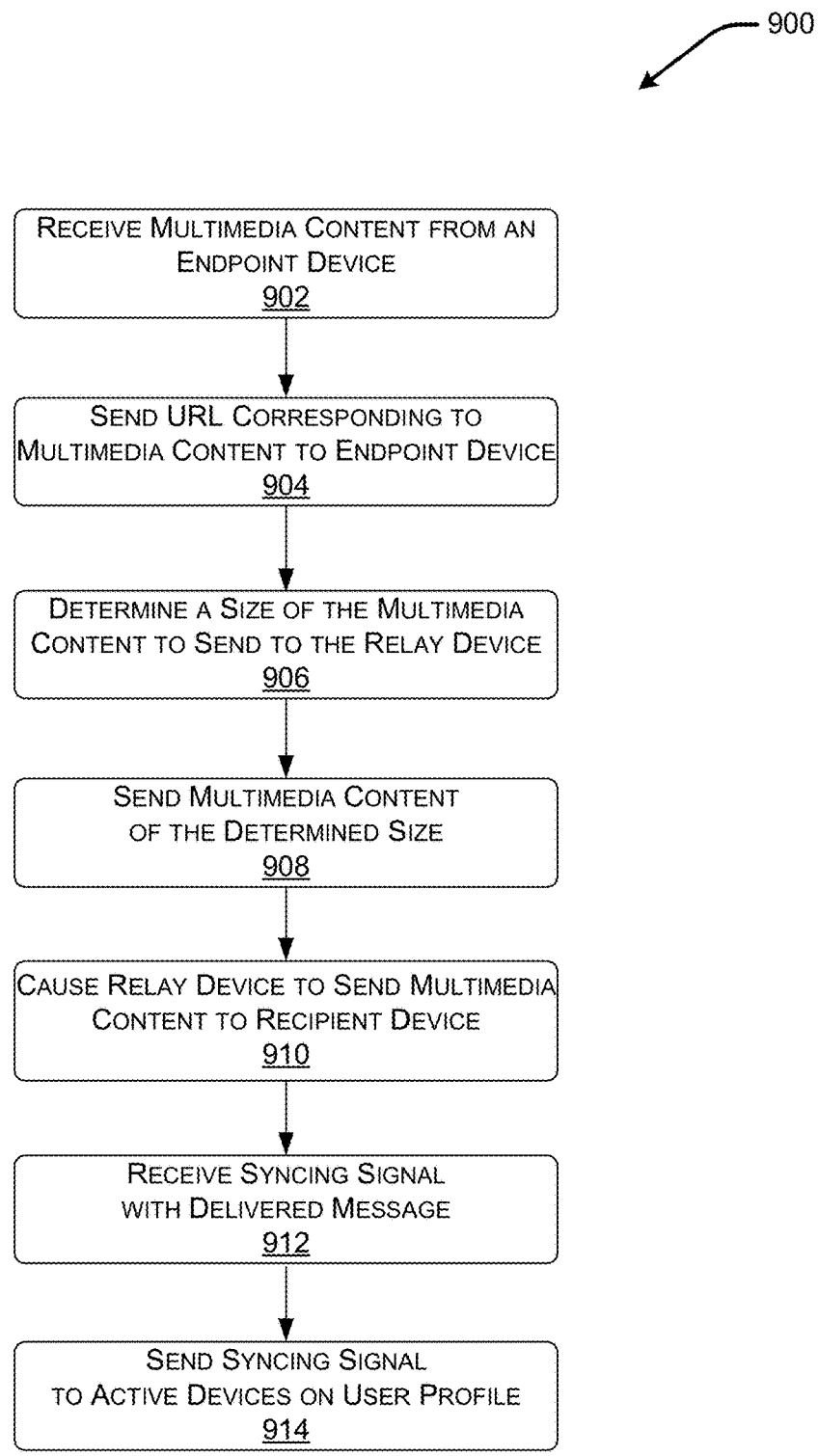
FIG. 9 is a flow diagram that illustrates a process flow of cross device messaging of a message including multimedia content.

FIG. 9 is a flow diagram that illustrates a process flow 900 of cross device messaging of a message including multimedia content.

At block 902, a computing system associated with a distributed service platform can receive multimedia content from an endpoint device. The multimedia content can be in the form of text, audio, images, animation, video, interactive content, and/or a combination thereof. In various examples, the computing system can store the multimedia content in a data store corresponding to a Uniform Resource Locator (URL).

At block 904, the computing system can send the URL to the endpoint device for inclusion in the message. The computing system can then receive a signal with the message including the URL, and can send the signal with the message to a relay device designated by the message.

At block 906, the computing system can determine a size of the multimedia content to send to the relay device. In various examples, the computing system can determine the size based on an indication by the relay device of the desired size of multimedia content. In some examples, the computing system can determine the size based on a known capability of the relay device, the recipient device and/or the mobile operator network. The capabilities of the relay device, the recipient device and/or the mobile operator network can be stored in the reference user profile. For example, the capability of the relay device and the corresponding mobile operator network can be stored in a user device settings data store of the reference user profile. For another example, the capability of the recipient device and the corresponding mobile operator network can be stored in a contacts data store of the reference user profile.

In some examples, the computing system can determine the size of the multimedia content by receiving an indication thereof from the relay device. In various examples, the relay device can save multimedia content capabilities of multiple recipient devices and corresponding mobile operator networks, such as in a contacts list on a database. In some examples, the relay device can query the recipient device for multimedia capabilities of the recipient device and/or a mobile operator corresponding to the recipient device.

For example, the relay device can query the recipient device regarding an RCS capability of the recipient device. Based on the query, the relay device can send the computing system an indication of the particular size of multimedia content to provide to the relay device.

At block 908, the computing system can send the multimedia content of the determined size to the relay device.

At block 910, the computing system can cause the relay device to send the multimedia content to the recipient device. In various examples, the computing system can cause the relay device to send the multimedia content by causing the message with the multimedia content to be saved in an outbox of the relay device. In such examples, the relay device can treat the message as an organically generated message (e.g., a message generated on the relay device itself).

At block 912, the computing system can receive a syncing signal with the delivered message. In various examples, the computing system can store the delivered message with the multimedia content in a data store of the reference user profile.

At block 914, the computing system can send the syncing signal to active devices on the user profile. In some examples, the syncing signal can include the delivered message and the multimedia content. In some examples, the syncing signal can include the delivered message and an indication of the delivered multimedia content. The indication can include a name of the multimedia content, a thumbnail size rendering of the multimedia content, or other indication requiring less storage space than the multimedia content itself. In such examples, the devices on the user profile can avoid duplication of multimedia content in data stores of the active devices.

The computing system can determine the active devices based at least in part on a recognition of devices logged on to the user profile. In various examples, the computing system can recognize newly logged on devices, and can send a syncing signal to the newly logged on devices including the messages and corresponding metadata delivered since the last time device was logged on to the user profile.

Figure 10:
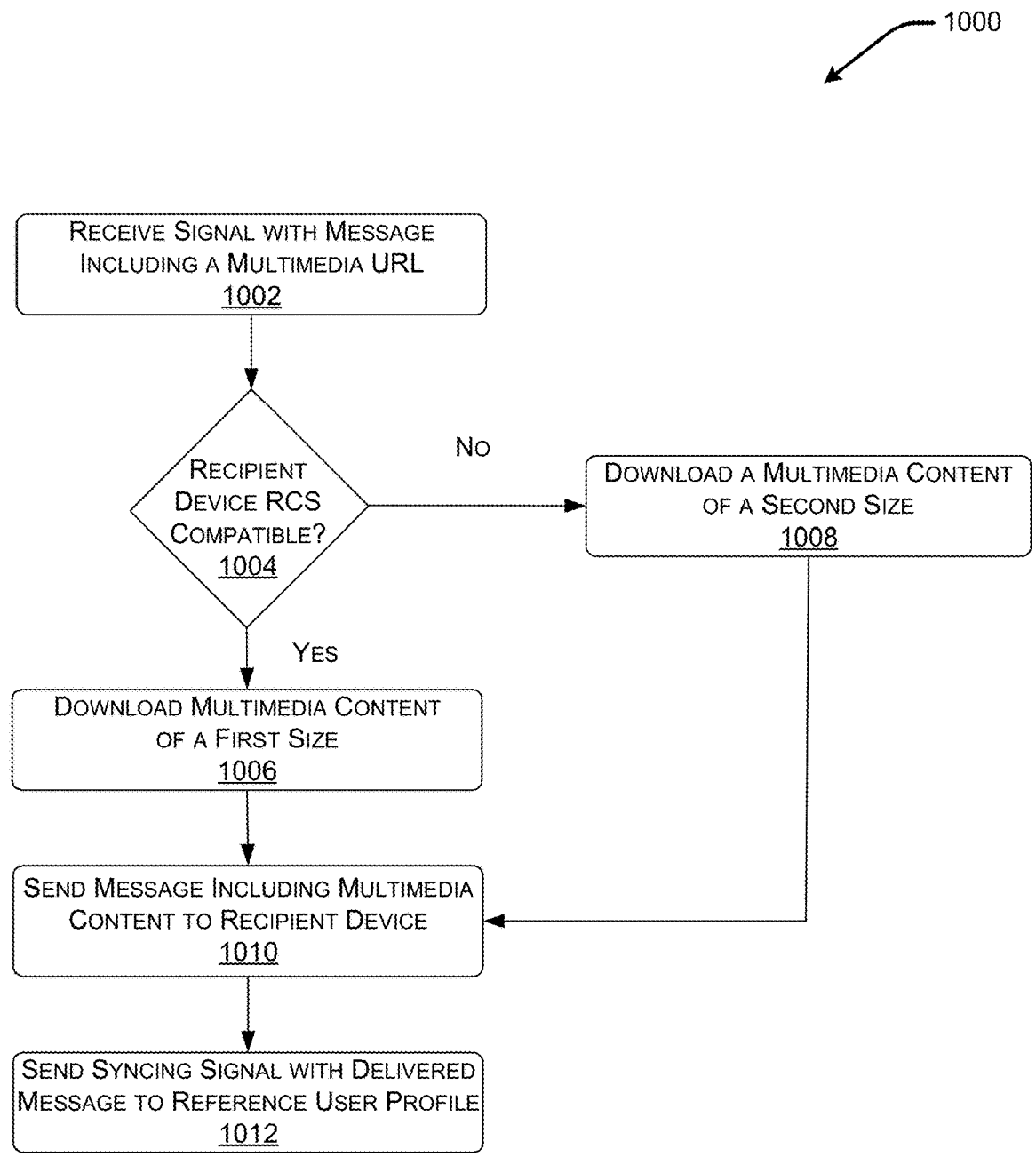
FIG. 10 is a flow diagram that illustrates a process flow of cross device messaging of a message including multimedia content.

FIG. 10 is a flow diagram that illustrates a process flow 1000 of cross device messaging of a message including multimedia content.

At block 1002, a relay device can receive a signal with a message containing a multimedia URL.

At block 1004, the relay device can determine if the recipient device is RCS compatible. In some examples, the relay device can determine the RCS compatibility of the recipient device based on data stored on the relay device, such as in a contacts list. In some examples, the relay device can access a contacts list storing the information in a reference user profile. In various examples, the relay device can query the recipient device to determine the RSC compatibility of the recipient device.

At block 1006, the relay device determines that the recipient device is RCS compatible, and downloads multimedia content of a first size. The multimedia content can be downloaded from a data store in a distributed service platform corresponding to the multimedia URL included in the message. In various examples, the relay device can indicate the first size of the multimedia content to download based at least in part on a selection of the multimedia URL. The first size At block 1008, the relay device determines that the recipient device is not RCS compatible, and downloads multimedia content of a second size. The multimedia content can be downloaded from a data store in a distributed service platform corresponding to the multimedia URL included in the message. In various examples, the relay device can indicate the second size of the multimedia content to download based at least in part on a selection of the multimedia URL. Based at least in part on the lack of RCS compatibility, the second size of multimedia content can be smaller than the first size.

At block 1010, the relay device can send the message with the multimedia content to the recipient device. The message can be sent via a mobile operator connection between the relay device and the recipient device.

At block 1012, the relay device can send a syncing signal with the delivered message to the reference user profile. Responsive to receiving the syncing signal, the reference user profile can synchronize the active devices with the delivered message.

Figure 11:
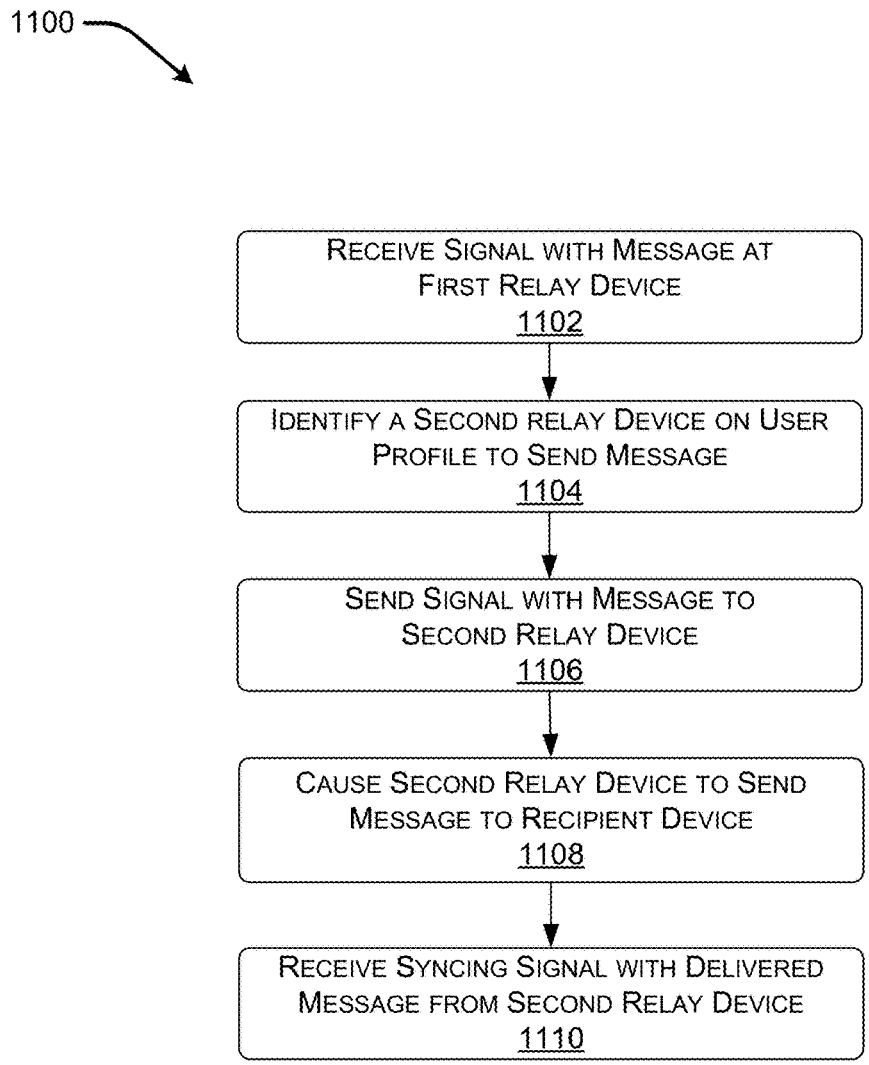
FIG. 11 is a flow diagram that illustrates a process flow of cross device messaging with multiple relay devices.

FIG. 11 is a flow diagram that illustrates a process flow 1100 of cross device messaging with multiple relay devices.

At block 1102, a first relay device can receive a signal with a message. The message can be an SMS, MMS, RCS, or other type of message. In various examples, the first relay device can store the message in a local data store.

At block 1104, the first relay device can identify a second relay device on the user profile to send the message. In various examples, the first relay device can determine that the country associated with the designated recipient device (e.g., a country code corresponding to a SIM card on the device) is different from a country associated with the first relay device. The first relay device can identify that the second relay device of the user profile is associated with a same country as the designated recipient device.

In various examples, the first relay device can identify the second relay device based at least in part on the presence document provided by the reference user profile. The presence document can include the active devices on the user profile and capabilities thereof, such as, for example, numbers and countries associated with SIM cards on the active devices. In some examples, the first relay device can identify the second relay device based on an indication from the endpoint device and/or the reference user profile that the second relay device will send the message via the mobile communication network.

At block 1106, the first relay device can send the signal with the message to the second relay device. In various examples, the first relay device can send the signal with the message via a network connection, such as, for example, an Internet connection.

At block 1108, the first relay device can cause the second relay device to send the message to the recipient device. In various examples, the first relay device can cause the relay device to send the message by causing the message to be saved in an outbox of the second relay device. In such examples, the second relay device can treat the message as an organically generated message (e.g., a message generated on the second relay device itself).

At block 1110, the first relay device and/or the reference user profile can receive a syncing signal with the delivered message from the second relay device. In various examples, the first relay device can receive the syncing signal, and can send the syncing signal to the reference user profile. Based on the receipt of the syncing signal, the reference user profile can synchronize the active devices with the delivered message.

Figure 12:
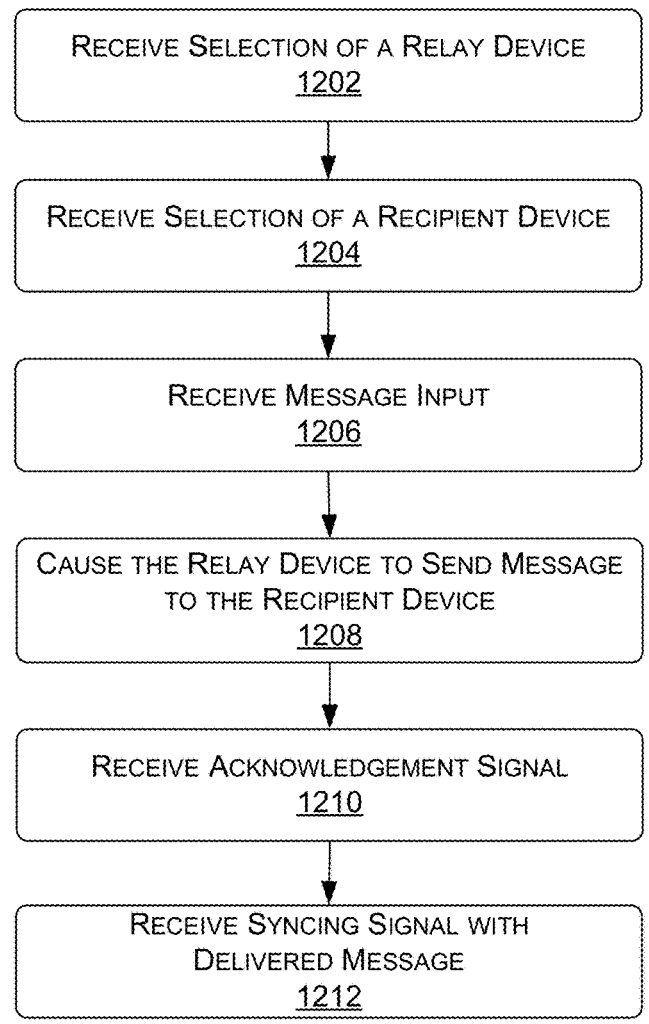
FIG. 12 is a flow diagram that illustrates a process flow of generating a message on a user interface of a cross device messaging system.

FIG. 12 is a flow diagram that illustrates a process flow 1200 of generating a message on a user interface of a cross device messaging system.

At block 1202, the endpoint device can receive selection of a relay device. In various examples, the selection can be received based on a presence document displayed on the user interface. The presence document can provide a list of the active devices (e.g., devices logged on to a user profile) of a user profile. In various examples, the presence document can be provided to the endpoint device by a reference user profile stored in a distributed service platform.

At block 1204, the endpoint device can receive selection of a recipient device. The recipient device can be device to which a message is intended to be delivered. In various examples, the recipient device can be selected from a list of contacts displayed on the user interface. In some examples, the recipient device can be selected based on an input of a name corresponding to a contact on the list on the user interface. In some examples, the recipient device can be selected based on an input of a number associated with the recipient device on the user interface.

At block 1206, the endpoint device can receive a message input. The message input can be in the form of text, audio, images, animation, video, interactive content, and/or a combination thereof. The message can be an SMS, MMS, RCS, and/or other type of message.

In various examples, the endpoint device can receive an indication of multimedia content to be included in the list. In one such examples, the multimedia content can be uploaded, via the user interface, to a data store on the distributed service platform. The distributed service platform can provide a URL corresponding to the multimedia content for inclusion in the message.

At block 1208, the endpoint device can cause the relay device to send the message to the recipient device via a mobile communication network. In various examples, the endpoint device can cause the relay device to send the message by causing the message to be stored in an outbox of the relay device.

At block 1210, the endpoint device can receive an acknowledgment signal. The acknowledgment signal can be an indication of receipt of the message by the relay device. In various examples, the endpoint device can determine that a message has failed based on a failure to receive the acknowledgment signal. In some examples, the endpoint device can determine that a message has failed based on a failure to receive the acknowledgment signal within a predetermined period of time. In response to a determination of message failure, the endpoint device can begin at block 908, and resend the message to the outbox of the relay device.

At block 1212, the endpoint device can receive a syncing signal with the delivered message. In various examples, the endpoint device can receive the syncing signal from the reference user profile. In some examples, the endpoint device can determine that the message failed to send based on a failure to receive the syncing signal. In some examples, the endpoint device can determine that the message failed to send based on a failure to receive the syncing signal within a predetermined period of time. In response to a determination of message failure, the endpoint device can begin at block 908, and resend the message to the outbox of the relay device.

Example Interfaces

Figure 13:
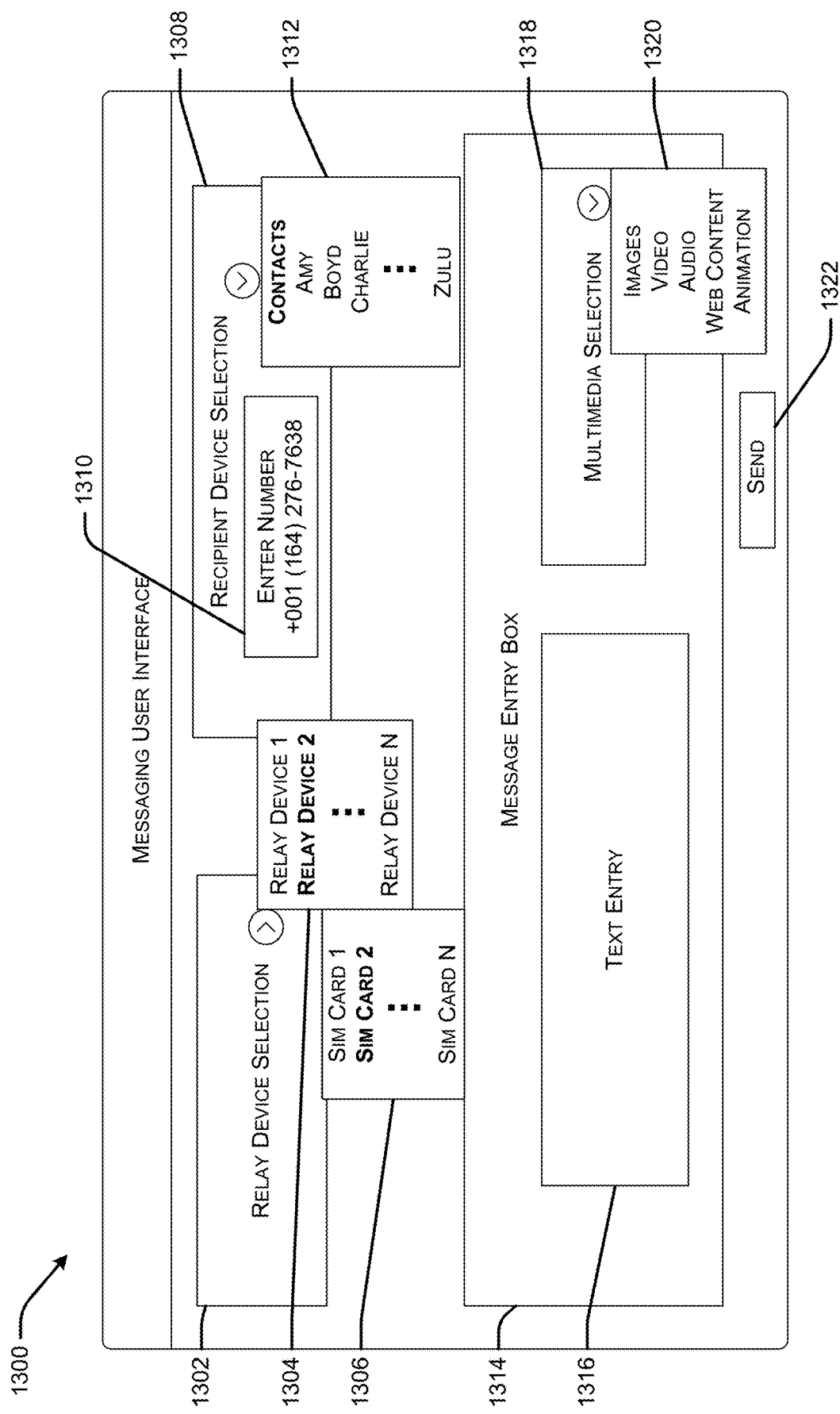
FIG. 13 illustrates an example messaging user interface used in the cross device messaging system consistent with the preceding figures.

FIG. 13 illustrates an example messaging user interface 1300 used in the cross device messaging system consistent with the preceding figures. In various examples, the messaging user interface 1300 can include a relay device selection 1302. In some examples, the relay device selection be based on a presence document 1304. The presence document 1304 can be a list of active devices on a user profile, data associated therewith (e.g., a number of SIM and/or RUID cards, phone numbers corresponding to SIM and/or RUID cards, a country associated with the active devices, etc.), and/or the capabilities thereof (e.g., RCS compatibility, etc.). The presence document 1304 can include a list of active relay devices and endpoint devices logged onto the user profile. In the illustrative example, the presence document 1304 includes multiple relay devices (e.g., relay device 1, relay device 2, relay device N). Responsive to a selection of a relay device, such as relay device 2, the relay device selection 1302 can display a SIM card menu 1306 for selection of a particular SIM card on the relay device. In some examples, the selection can be of more than one relay device. In such examples, the more than one relay device can send the message substantially simultaneously. Additionally or alternatively, the relay device selection 1302 can display a country associated with various SIM cards on the relay device. In various examples, the relay device selection 1302 can also include a security pin entry box for access to designated SIM cards.

In various examples, the messaging user interface 1300 can include a recipient device selection 1308. The recipient device selection 1308 can provide an interface in which one or more recipient devices can be selected. The recipient device selection 1308 can include an entry box 1310 for entering one or more numbers associated with the designated recipient devices. Additionally, the recipient device selection 1308 can include a contacts menu 1312 for selecting one or more contacts saved to the user profile and numbers associated therewith.

The messaging user interface 1300 can include a message entry box 1314. The message entry box 1314 can include a text entry 1316 and/or a multimedia selection 1318. The message entry box 1314 can be an interface for text entry corresponding to the message. In some examples, the message entry box 1314 can have a character and/or word limit.

The multimedia selection 1318 can provide a means by which multimedia can be included in the message. For example, the multimedia selection 1318 can include a multimedia menu 1320 through which multimedia can be selected. The multimedia can include text, audio, images, animation, video, interactive content, and/or a combination thereof. In some examples, the multimedia menu 1320 can include a means by which web content can be selected. In such examples, a selection of web content can include a selection of a particular multimedia content on a particular web page, such as, for example, a cat video posted on YouTube®.

In various examples, the messaging user interface 1300 can include a send selection 1322. The send button 1322 can store the data entered in the relay device selection 1302, the recipient device selection 1308, and/or the message entry box 1314 in a local data store of the endpoint device. Additionally, the send selection 1322 can cause the message to be sent to the designated recipient device via designated relay device, as described above with respect to FIGS. 1-9.

Example Clauses

A: A system comprising: a processor; a computer-readable medium having thereon computer-executable instructions, the computer executable instructions responsive to execution to configure a device to perform operations comprising: storing a user profile, the user profile comprising a presence document indicating active devices associated with the user profile; receiving, from a first device referenced in the presence document, a signal comprising a message designating a second device referenced in the presence document and a third device; sending, to the second device, the signal comprising the message; causing the second device to send the message to the third device via a mobile operator network; receiving, from the second device, a synchronization signal comprising a delivered message, the delivered message comprising the message and metadata associated with a delivery of the message to the third device; storing the delivered message to the user profile; and sending the delivered message to the active devices associated with the user profile.

B: A system as paragraph A describes, the operations further comprising: receiving, from the second device, an acknowledgment signal, wherein the acknowledgment signal comprises an indication of receipt of the message; and sending, to the first device, the acknowledgment signal.

C: A system as paragraph A describes, the operations further comprising: determining a passage of a predetermined period from the sending the signal comprising the message without receiving an acknowledgment signal, wherein the acknowledgement signal comprises an indication of receipt of the signal; and determining, based at least in part on not receiving the acknowledgment signal, a failure of the second device to send the message to the third device.

D: A system as either of paragraphs A or B describe, the operations further comprising: receiving, from the first device, multimedia content; storing the multimedia content in a data store; and sending, to the first device, a Uniform Resource Locator associated with the multimedia content in the data store.

E: A system as any of paragraphs A, B or D describe, wherein the message comprises a Uniform Resource Locator corresponding to multimedia content and the operations further comprise: determining a size of the multimedia content to send to the third device; and sending the multimedia content of the size to the second device.

F: A system as paragraph E describes, wherein the size is determined based at least in part on a multimedia capability of the third device.

G: A system as any of paragraphs A, B, D, E, or F describe, wherein the second device is one of a plurality of relay devices referenced in the presence document and the third device is one of a plurality of recipient devices, and the operations further comprise: sending, to the plurality of relay devices device, the signal comprising the message; causing the plurality of devices to send the message to the plurality of recipient devices via the mobile operator network.

H: A system as any of paragraphs A, B, D, E, F, or G describe, wherein the message includes at least one of: a short message service message; a multimedia message service message; or a rich communication service message.

I: A method comprising: receiving, from a first device associated with a user profile, a signal comprising a message designating a second device associated with the user profile to send the message and a third device to receive the message; sending, to the second device, the signal comprising the message; causing the second device to deliver the message to the third device; receiving, from the second device, a synchronization signal comprising a delivered message, the delivered message comprising the message and metadata associated with delivery of the message to the third device; storing the delivered message to the user profile; and sending the delivered message to at least one active device associated with the user profile.

J: A method as paragraph I describes, further comprising: receiving, from the second device, an acknowledgment signal, wherein the acknowledgment signal comprises an indication of receipt of the message; and sending, to the first device, the acknowledgment signal.

K: A method as either of paragraphs I or J describe, further comprising: determining that the message comprises multimedia content; and identifying a size of the multimedia content, the size of the multimedia content being based at least in part on a capability of the third device, wherein the sending the signal comprising the message further comprises sending the multimedia content of the size.

L: A method as any of paragraphs I-K describe, further comprising: receiving, from the first device, multimedia content to include in the message; storing the multimedia content in a data store; and sending, to the first device, a Uniform Resource Locator associated with the multimedia content in the data store.

M: A method as any of paragraphs I-L describe, further comprising: determining that the second device associated with the user profile is associated with a first country and the third device is associated with a second country, wherein the causing the second device to deliver the message comprises: identifying a fourth device, wherein the fourth device is associated with the user profile, and is configured to send messages via a mobile operator network in the second country; sending, to the fourth device, the signal comprising the message; and causing the fourth device to send the message to the recipient device via a mobile operator network.

N: A method as any of paragraphs I-M describe, wherein the message is sent to the second device via a network connection, and the message is delivered to the third device via a mobile operator connection.

O: A method as any of paragraphs I-N describe, further comprising: receiving, from the second device, a second synchronization signal, the second synchronization signal comprising updated data with respect to a delivery of the message; and sending the updated data to the one or more active devices associated with the user profile.

P: A computer-readable medium having thereon computer-executable instructions that, responsive to execution, configure a computer to perform a method as any of paragraphs I-O describe.

Q: A device or system comprising: a processor; and a computer-readable medium coupled to the processor, the computer-readable medium including instructions to configure one or more devices to perform a method as any of paragraphs I-O describe.

R: A device comprising: a processor; a computer-readable medium having thereon computer-executable instructions, the computer executable instructions responsive to execution to configure the device to perform operations comprising: receiving a signal comprising a message; sending an acknowledgment signal to a reference user profile, wherein the acknowledgement signal comprises an indication of receipt of the message; sending the message to a recipient device via a mobile operator network; and causing a synchronization of active devices on a user profile by sending a signal comprising a delivered message to a reference user profile corresponding to the user profile, wherein the delivered message includes data associated with delivery of the message.

S: A device as paragraph Q describes, the operations further comprising: determining that the message comprises multimedia content; determining a size of the multimedia content to download; downloading the multimedia content of the size; and sending the message with the multimedia content to the recipient device T: A device as paragraph S describes, wherein the determining the size of the multimedia content to download is based on a multimedia capability of at least one of: the device; the recipient device; or the mobile operator network.

U: A device as any of paragraphs R-T describe, the operations further comprising: determining that a second device associated with the user profile is associated with a same country as the recipient device; causing the second device to send the message to the recipient device via a mobile operator network; and receiving the signal comprising the delivered message from the second device.

V: A device as any of paragraphs R-U describe, wherein the device is one of a plurality of devices associated with the user profile, the recipient device is one of a plurality of recipient devices, and the sending the message to the recipient device further comprises sending, by the plurality of devices associated with the user profile, the message to the plurality of recipient devices substantially simultaneously.

W: A computer-readable medium having thereon computer-executable instructions, the computer-executable instructions responsive to execution configuring a device to perform operations comprising: receiving a signal comprising a message; sending an acknowledgment signal to a reference user profile, wherein the acknowledgement signal comprises an indication of receipt of the message; sending the message to a recipient device via a mobile operator network; and causing a synchronization of active devices on a user profile by sending a signal comprising a delivered message to a reference user profile corresponding to the user profile, wherein the delivered message includes data associated with delivery of the message.

X: A computer-readable medium as paragraph W describes, the operations further comprising: determining that the message comprises multimedia content; determining a size of the multimedia content to download; downloading the multimedia content of the size; and sending the message with the multimedia content to the recipient device.

Y: A computer-readable medium as paragraph X describes, wherein the determining the size of the multimedia content to download is based on a multimedia capability of at least one of the device; the recipient device; or the mobile operator network.

Z: A device as any of paragraphs W-Y describe, the operations further comprising: determining that a second device associated with the user profile is associated with a same country as the recipient device; causing the second device to send the message to the recipient device via a mobile operator network; and receiving the signal comprising the delivered message from the second device.

AA: A device as any of paragraphs W-Z describe, wherein the device is one of a plurality of devices associated with the user profile, the recipient device is one of a plurality of recipient devices, and the sending the message to the recipient device further comprises sending, by the plurality of devices associated with the user profile, the message to the plurality of recipient devices substantially simultaneously.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 128, 200, 302, or 304 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
a processor;
a computer-readable medium storing executable instructions for causing the processor to perform operations comprising:
storing a user profile, the user profile including device information (i) indicating a plurality of active devices associated with the user profile and (ii) one or more potential relay devices arranged for relaying messages to one or more recipient devices via a mobile wireless network;
providing the device information to a first device among the active devices referenced in the device information;
receiving, from the first device, first multimedia content to be provided to at least a respective recipient device of the one or more recipient devices;
storing the first multimedia content in a persistent memory associated with a first network address;
providing, to the first device, the first network address for obtaining a copy of the first multimedia content to the first device;
receiving, from the first device, a first signal including a message designating the respective recipient device and the first network address associated with the first multimedia content to be provided to the respective recipient device;
selecting one or more relay devices from the one or more potential relay devices in response to receiving the first signal;
sending the first signal and the first network address to the selected one or more relay devices to
cause the one or more relay devices to relay the first signal to the respective recipient device, and
cause a respective relay device of the one or more relay devices to query the respective recipient device for capabilities of the respective recipient device, download a copy of the first multimedia content of a designated size from the first network address based on the capabilities of the recipient device, and provide the first multimedia content to the respective recipient device, wherein the respective relay device is in communication with the recipient device via a mobile communication network; and
sending the first signal to each of the plurality of active devices other than the first device and the selected one or more relay devices.

2. The system of claim 1, wherein:
the message received from the first device includes an indication of the one or more potential relay devices selected by the first device.

3. The system of claim 1, wherein the computer-readable medium further includes instructions for causing the processor to perform operations comprising:
providing the device information to a selected relay device of the one or more potential relay devices; and
receiving an indication of one or more potential relay devices selected by the selected relay device, wherein to send the first signal, the computer-readable medium further includes instructions for causing the processor to perform operations comprising sending the first signal including the message to the one or more potential relay devices selected by the selected relay device.

4. The system of claim 1, wherein the computer-readable medium further includes instructions for causing the processor to perform operations comprising:
causing the message to be sent to one or more third devices by the one or more relay devices; and
receiving, from the one or more relay devices, one or more synchronization signals comprising a delivered message, the delivered message comprising the message and metadata associated with a delivery of the message to a respective one of the one or more third devices.

5. The system of claim 4, wherein the one or more third devices comprise at least one relay device.

6. The system of claim 4, wherein the one or more third devices comprise at least one recipient device.

7. A method comprising:
storing a user profile, the user profile including device information indicating a plurality of active devices associated with the user profile and one or more potential relay devices arranged for relaying messages to one or more recipient devices via a mobile wireless network;
providing the device information to a first device that is referenced in the device information;
receiving, from the first device, first multimedia content to be provided to at least a respective recipient device of the one or more recipient devices;
storing the first multimedia content in a persistent memory associated with a first network address;
providing, to the first device, the first network address for obtaining a copy of the first multimedia content to the first device;
receiving, from the first device, a first signal including a message designating the respective recipient device and the first network address associated with the first multimedia content to be provided to the respective recipient device;
selecting one or more relay devices from the one or more potential relay devices in response to receiving the first signal;
sending the first signal and the first network address to the selected one or more relay devices to
cause the one or more relay devices to relay the first signal to the respective recipient device, and
cause a respective relay device of the one or more relay devices to query the respective recipient device for capabilities of the respective recipient device, download a copy of the first multimedia content of a designated size from the first network address based on the capabilities of the recipient device, and provide the first multimedia content to the respective recipient device, wherein the respective relay device is in communication with the recipient device via a mobile communication network; and
sending the first signal to each of the plurality of active devices other than the first device and the selected one or more relay devices.

8. The method of claim 7, wherein:
the message received from the first device includes an indication of one or more potential relay devices selected by the first device.

9. The method of claim 7, further comprising:
providing the device information to a selected relay device of the one or more potential relay devices; and
receiving an indication of one or more potential relay devices selected by the selected relay device, wherein sending the first signal includes sending the first signal comprising the message to the one or more potential relay devices selected by the selected relay device.

10. The method of claim 7, further comprising:
causing the message to be sent to one or more third devices by the one or more relay devices; and
receiving, from the one or more relay devices, one or more synchronization signals comprising a delivered message, the delivered message comprising the message and metadata associated with a delivery of the message to a respective one of the one or more third devices.

11. The method of claim 10, wherein the one or more third devices comprise at least one relay device.

12. The method of claim 10, wherein the one or more third devices comprise at least one active device.

13. A memory device storing instructions that, when executed on a processor of a computing device, cause the computing device to relay messages, by:
storing a user profile, the user profile including device information indicating a plurality of active devices associated with the user profile and one or more potential relay devices arranged for relaying messages to one or more recipient devices via a mobile wireless network;
providing the device information to a first device that is referenced in the device information;
receiving, from the first device, first multimedia content to be provided to at least a respective recipient device of the one or more recipient devices;
storing the first multimedia content in a persistent memory associated with a first network address;
providing, to the first device, the first network address for obtaining a copy of the first multimedia content to the first device;
receiving, from the first device, a first signal including a message designating the respective recipient device and the first network address associated with the first multimedia content to be provided to the respective recipient device;
selecting one or more relay devices from the one or more potential relay devices in response to receiving the first signal;
sending the first signal and the first network address to the selected one or more relay devices to
cause the one or more relay devices to relay the first signal to the respective recipient device, and
cause a respective relay device of the one or more relay devices to query the respective recipient device for capabilities of the respective recipient device, download a copy of the first multimedia content of a designated size from the first network address based on the capabilities of the recipient device, and provide the first multimedia content to the respective recipient device, wherein the respective relay device is in communication with the recipient device via a mobile communication network; and
sending the first signal to each of the plurality of active devices other than the first device and the selected one or more relay devices.

14. The memory device of claim 13, wherein:
the message received from the first device includes an indication of the one or more potential relay devices selected by the first device.

15. The memory device of claim 13, further comprising instructions that, when executed on the processor cause the computing device to:
provide the device information to a selected relay device of the one or more potential relay devices; and
receive an indication of one or more potential relay devices selected by the selected relay device, wherein sending the first signal includes sending the first signal comprising the message to the one or more potential relay devices selected by the selected relay device.

16. The memory device of claim 13, further comprising instructions that, when executed on the processor cause the computing device to:
cause the message to be sent to one or more third devices by the one or more relay devices; and
receive, from the one or more relay devices, one or more synchronization signals comprising a delivered message, the delivered message comprising the message and metadata associated with a delivery of the message to a respective one of the one or more third devices.

17. The memory device of claim 16, wherein the one or more third devices comprise at least one relay device.

18. The memory device of claim 16, wherein the one or more third devices comprise at least one active device.

19. The system of claim 1, wherein the computer-readable medium further includes instructions for causing the processor to perform operations comprising:
receiving a second signal from a second recipient device of the one or more recipient devices;
providing the second signal to the plurality of active devices associated with the user profile including the first device;
determining a usage state of each of the plurality of active devices; and
causing one or more of the active devices to display a notification of receipt of the second signal based on the usage state of the one or more active devices.

* * * * *